(12) United States Patent
Robinson et al.

(10) Patent No.: US 7,880,730 B2
(45) Date of Patent: *Feb. 1, 2011

(54) KEYBOARD SYSTEM WITH AUTOMATIC CORRECTION

(75) Inventors: B. Alex Robinson, Maple Valley, WA (US); Michael R. Longe, Seattle, WA (US); David Jon Kay, Seattle, WA (US); Gordon Robert Waddell, Seattle, WA (US)

(73) Assignee: Tegic Communications, Inc., Seattle, WA (US)

( * ) Notice: Subject to any disclaimer, the term of this patent is extended or adjusted under 35 U.S.C. 154(b) by 723 days.

This patent is subject to a terminal disclaimer.

(21) Appl. No.: 11/853,320

(22) Filed: Sep. 11, 2007

(65) Prior Publication Data

US 2008/0100579 A1   May 1, 2008

Related U.S. Application Data

(60) Continuation of application No. 11/090,464, filed on Mar. 25, 2005, now Pat. No. 7,277,088, which is a division of application No. 10/775,483, filed on Feb. 9, 2004, now Pat. No. 7,088,345.

(51) Int. Cl.
   *G09G 5/00* (2006.01)
(52) U.S. Cl. .................................. 345/173; 345/172
(58) Field of Classification Search .................... None
   See application file for complete search history.

(56) References Cited

U.S. PATENT DOCUMENTS

| | | | |
|---|---|---|---|
| 3,980,869 A | 9/1976 | Lombardino et al. | |
| 4,286,329 A | 8/1981 | Goertzel et al. | |
| 4,365,235 A | 12/1982 | Greanias et al. | |
| 4,439,649 A | 3/1984 | Cecchi | |
| 4,454,592 A | 6/1984 | Cason et al. | |

(Continued)

FOREIGN PATENT DOCUMENTS

CN   1116335 A   2/1996

(Continued)

OTHER PUBLICATIONS

John Arnott, "Probabilistic Character Disambiguation for Reduced Keyboards Using Small Text Samples," Sep. 1992, AAC Augmentative and Alternative Communication, vol. 8, No. 3, pp. 215-223.

(Continued)

*Primary Examiner*—Amare Mengistu
*Assistant Examiner*—Antonio Xavier
(74) *Attorney, Agent, or Firm*—Michael A. Glenn; Glenn Patent Group

(57) ABSTRACT

There is disclosed an enhanced text entry system which determines one or more alternate textual interpretations of each sequence of inputs detected within a designated auto-correcting keyboard region. The actual contact locations for the keystrokes may occur outside the boundaries of the specific keyboard key regions associated with the actual characters of the word interpretations proposed or offered for selection, where the distance from each contact location to each corresponding intended character may in general increase with the expected frequency of the intended word in the language or in a particular context.

58 Claims, 20 Drawing Sheets

U.S. PATENT DOCUMENTS

| | | |
|---|---|---|
| 4,559,598 A | 12/1985 | Goldwasser et al. |
| 4,561,105 A | 12/1985 | Crane et al. |
| 4,573,196 A | 2/1986 | Crane et al. |
| 4,689,768 A | 8/1987 | Heard et al. |
| 4,725,694 A | 2/1988 | Auer et al. |
| 4,782,464 A | 11/1988 | Gray et al. |
| 4,783,758 A | 11/1988 | Kucera |
| 4,783,761 A | 11/1988 | Gray et al. |
| 4,891,777 A | 1/1990 | Lapeyre |
| 4,891,786 A | 1/1990 | Goldwasser |
| 5,109,352 A | 4/1992 | O'Dell |
| 5,127,055 A | 6/1992 | Larkey |
| 5,187,480 A | 2/1993 | Thomas et al. |
| 5,224,179 A | 6/1993 | Denker et al. |
| 5,305,205 A | 4/1994 | Weber et al. |
| 5,317,507 A | 5/1994 | Gallant |
| 5,457,454 A | 10/1995 | Sugano |
| 5,462,711 A | 10/1995 | Ricottone |
| 5,533,147 A | 7/1996 | Arai et al. |
| 5,561,446 A | 10/1996 | Montlick |
| 5,574,482 A | 11/1996 | Niemeier |
| 5,583,946 A | 12/1996 | Gourdol |
| 5,586,198 A | 12/1996 | Lakritz |
| 5,612,690 A | 3/1997 | Levy |
| 5,649,223 A | 7/1997 | Freeman |
| 5,664,896 A | 9/1997 | Blumberg |
| 5,734,750 A | 3/1998 | Arai et al. |
| 5,745,719 A | 4/1998 | Falcon |
| 5,748,512 A | 5/1998 | Vargas |
| 5,754,686 A | 5/1998 | Harada et al. |
| 5,784,008 A | 7/1998 | Raguseo |
| 5,796,867 A | 8/1998 | Chen et al. |
| 5,798,760 A | 8/1998 | Vayda et al. |
| 5,805,911 A | 9/1998 | Miller |
| 5,812,696 A | 9/1998 | Arai et al. |
| 5,812,697 A | 9/1998 | Sakai et al. |
| 5,818,437 A | 10/1998 | Grover et al. |
| 5,870,492 A | 2/1999 | Shimizu et al. |
| 5,896,321 A | 4/1999 | Miller et al. |
| 5,917,476 A | 6/1999 | Czerniecki |
| 5,923,793 A | 7/1999 | Ikebata |
| 5,926,566 A | 7/1999 | Wang et al. |
| 5,933,526 A | 8/1999 | Sklarew |
| 5,952,942 A | 9/1999 | Balakrishnan et al. |
| 5,953,541 A | 9/1999 | King et al. |
| 5,956,021 A | 9/1999 | Kubota et al. |
| 5,963,671 A | 10/1999 | Comerford et al. |
| 5,973,676 A | 10/1999 | Kawakura |
| 6,002,390 A | 12/1999 | Masui |
| 6,002,799 A | 12/1999 | Sklarew |
| 6,005,495 A | 12/1999 | Connolly et al. |
| 6,008,799 A | 12/1999 | Van Kleeck |
| 6,009,444 A | 12/1999 | Chen |
| 6,011,554 A | 1/2000 | King et al. |
| 6,028,959 A | 2/2000 | Wang et al. |
| 6,041,137 A | 3/2000 | Van Kleeck |
| 6,044,165 A | 3/2000 | Perona et al. |
| 6,054,941 A | 4/2000 | Chen |
| 6,075,469 A | 6/2000 | Pong |
| 6,094,197 A | 7/2000 | Buxton et al. |
| 6,104,317 A | 8/2000 | Panagrossi |
| 6,104,384 A | 8/2000 | Moon et al. |
| 6,111,573 A | 8/2000 | McComb et al. |
| 6,130,962 A | 10/2000 | Sakurai |
| 6,144,764 A | 11/2000 | Yamakawa et al. |
| 6,148,104 A | 11/2000 | Wang et al. |
| 6,157,379 A | 12/2000 | Singh |
| 6,169,538 B1 | 1/2001 | Nowlan et al. |
| 6,172,625 B1 | 1/2001 | Jin et al. |
| 6,204,848 B1 | 3/2001 | Nowlan et al. |
| 6,212,297 B1 | 4/2001 | Sklarew |
| 6,223,059 B1 | 4/2001 | Haestrup |
| 6,275,611 B1 | 8/2001 | Parthasaranthy |
| 6,278,445 B1 | 8/2001 | Tanaka et al. |
| 6,286,064 B1 | 9/2001 | King et al. |
| 6,307,549 B1 | 10/2001 | King et al. |
| 6,314,418 B1 | 11/2001 | Namba |
| 6,320,943 B1 | 11/2001 | Borland |
| 6,346,894 B1 | 2/2002 | Connolly et al. |
| 6,362,752 B1 | 3/2002 | Guo et al. |
| 6,392,640 B1 | 5/2002 | Will |
| 6,424,743 B1 | 7/2002 | Ebrahimi |
| 6,437,709 B1 | 8/2002 | Hao |
| 6,448,987 B1 | 9/2002 | Easty et al. |
| 6,453,079 B1 | 9/2002 | McInerny |
| 6,489,951 B1 | 12/2002 | Wong et al. |
| 6,493,464 B1 | 12/2002 | Hawkins et al. |
| 6,502,118 B1 | 12/2002 | Chatterjee |
| 6,542,170 B1 | 4/2003 | Williams et al. |
| 6,549,219 B2 | 4/2003 | Selker |
| 6,567,072 B2 | 5/2003 | Watanabe |
| 6,585,162 B2 | 7/2003 | Sandbach et al. |
| 6,616,703 B1 | 9/2003 | Nakagawa |
| 6,654,733 B1 | 11/2003 | Goodman et al. |
| 6,686,852 B1 | 2/2004 | Guo |
| 6,686,907 B2 | 2/2004 | Su et al. |
| 6,711,290 B2 | 3/2004 | Sparr et al. |
| 6,757,544 B2 | 6/2004 | Rangarajan et al. |
| 6,765,554 B2 | 7/2004 | Millington |
| 6,765,567 B1 | 7/2004 | Roberson et al. |
| 6,801,190 B1 * | 10/2004 | Robinson et al. ............ 345/173 |
| 6,801,659 B1 | 10/2004 | O'Dell |
| 6,807,529 B2 | 10/2004 | Johnson et al. |
| 6,819,315 B2 | 11/2004 | Toepke et al. |
| 6,820,075 B2 | 11/2004 | Shanahan et al. |
| 6,829,607 B1 | 12/2004 | Tafoya et al. |
| 6,864,809 B2 | 3/2005 | O'Dell et al. |
| 6,904,402 B1 | 6/2005 | Wang et al. |
| 6,912,581 B2 | 6/2005 | Johnson et al. |
| 6,947,771 B2 | 9/2005 | Guo et al. |
| 6,955,602 B2 | 10/2005 | Williams |
| 6,956,968 B1 | 10/2005 | O'Dell et al. |
| 6,970,599 B2 | 11/2005 | Longe et al. |
| 6,973,332 B2 | 12/2005 | Mirkin et al. |
| 6,982,658 B2 | 1/2006 | Guo |
| 6,990,534 B2 | 1/2006 | Mikhailov et al. |
| 7,020,270 B1 | 3/2006 | Ghassabian |
| 7,020,849 B1 | 3/2006 | Chen |
| 7,030,863 B2 * | 4/2006 | Longe et al. ................ 345/173 |
| 7,057,607 B2 | 6/2006 | Mayoraz et al. |
| 7,075,520 B2 | 7/2006 | Williams |
| 7,088,345 B2 * | 8/2006 | Robinson et al. ............ 345/173 |
| 7,088,861 B2 | 8/2006 | Van Meurs |
| 7,095,403 B2 | 8/2006 | Lyustin et al. |
| 7,107,204 B1 | 9/2006 | Liu et al. |
| 7,139,430 B2 | 11/2006 | Sparr et al. |
| 7,149,550 B2 | 12/2006 | Kraft et al. |
| 7,151,533 B2 | 12/2006 | Van Ieperen |
| 7,155,683 B2 | 12/2006 | Williams |
| 7,162,305 B2 | 1/2007 | Tong et al. |
| 7,177,797 B1 | 2/2007 | Micher et al. |
| 7,224,989 B2 | 5/2007 | Kraft |
| 7,256,769 B2 | 8/2007 | Pun et al. |
| 7,257,528 B1 | 8/2007 | Ritchie et al. |
| 7,272,564 B2 | 9/2007 | Phillips et al. |
| 7,275,029 B1 | 9/2007 | Gao et al. |
| 7,277,088 B2 * | 10/2007 | Robinson et al. ............ 345/173 |
| 7,293,231 B1 | 11/2007 | Gunn et al. |
| 7,313,277 B2 | 12/2007 | Morwing et al. |
| 7,349,576 B2 | 3/2008 | Hotsberg |
| 7,385,531 B2 | 6/2008 | Zhang |
| 7,389,235 B2 | 6/2008 | Dvorak |
| 7,437,001 B2 | 10/2008 | Morwing et al. |
| 7,466,859 B2 | 12/2008 | Chang et al. |

| | | |
|---|---|---|
| 2001/0048425 A1 | 12/2001 | Partridge |
| 2002/0093491 A1 | 7/2002 | Gillespie et al. |
| 2002/0122072 A1 | 9/2002 | Selker |
| 2002/0135499 A1 | 9/2002 | Guo |
| 2002/0135561 A1 | 9/2002 | Rojewski |
| 2002/0145587 A1 | 10/2002 | Watanabe |
| 2002/0163544 A1 | 11/2002 | Baker et al. |
| 2002/0168107 A1 | 11/2002 | Tang et al. |
| 2003/0006956 A1 | 1/2003 | Wu et al. |
| 2003/0023426 A1 | 1/2003 | Pun et al. |
| 2003/0048257 A1 | 3/2003 | Mattila |
| 2003/0054830 A1 | 3/2003 | Williams et al. |
| 2003/0144830 A1 | 7/2003 | Williams |
| 2003/0179930 A1 | 9/2003 | O'Dell et al. |
| 2003/0184451 A1 | 10/2003 | Li |
| 2003/0234766 A1 | 12/2003 | Hildebrand |
| 2004/0153963 A1 | 8/2004 | Simpson et al. |
| 2004/0153975 A1 | 8/2004 | Williams et al. |
| 2004/0163032 A1 | 8/2004 | Guo et al. |
| 2004/0243389 A1 | 12/2004 | Thomas et al. |
| 2005/0060138 A1 | 3/2005 | Wang et al. |
| 2005/0114770 A1 | 5/2005 | Sacher et al. |
| 2005/0223308 A1 | 10/2005 | Gunn et al. |
| 2006/0062461 A1 | 3/2006 | Longe et al. |
| 2006/0129928 A1 | 6/2006 | Qiu |
| 2006/0136408 A1 | 6/2006 | Weir et al. |
| 2006/0155536 A1 | 7/2006 | Williams et al. |
| 2006/0158436 A1 | 7/2006 | LaPointe et al. |
| 2006/0173807 A1 | 8/2006 | Weir et al. |
| 2006/0190819 A1 | 8/2006 | Ostergaard et al. |
| 2006/0193519 A1 | 8/2006 | Sternby |
| 2006/0236239 A1 | 10/2006 | Simpson et al. |
| 2006/0239560 A1 | 10/2006 | Sternby |
| 2006/0247915 A1 | 11/2006 | Bradford et al. |
| 2007/0094718 A1 | 4/2007 | Simpson |
| 2007/0203879 A1 | 8/2007 | Templeton-Steadman et al. |
| 2007/0276414 A1 | 11/2007 | Williams |
| 2007/0285397 A1 | 12/2007 | LaPointe et al. |
| 2008/0130996 A1 | 6/2008 | Sternby |

FOREIGN PATENT DOCUMENTS

| | | |
|---|---|---|
| CN | 1190205 A | 8/1998 |
| CN | 1232204 A | 10/1999 |
| CN | 1358299 A | 7/2002 |
| CN | 1606753 | 4/2005 |
| DE | 3401942 | 11/1984 |
| EP | 0114250 | 11/1983 |
| EP | 0739521 | 5/1996 |
| EP | 0762265 | 3/1997 |
| EP | 0858023 | 8/1998 |
| EP | 0961208 | 12/1999 |
| EP | 1018679 | 12/1999 |
| EP | 1085401 | 3/2001 |
| EP | 1168780 | 1/2002 |
| EP | 1355225 | 10/2003 |
| FR | 2824979 | 11/2002 |
| JP | 57010832 | 1/1982 |
| JP | 62065136 | 3/1987 |
| JP | 1023021 | 1/1989 |
| JP | 1047565 | 2/1989 |
| JP | 1993-081482 | 4/1993 |
| JP | 1994-083816 | 3/1994 |
| JP | 7094376 | 4/1995 |
| JP | 1995-146918 | 6/1995 |
| JP | 1996-305701 | 11/1996 |
| JP | 8319721 | 12/1996 |
| JP | 10135399 | 5/1998 |
| JP | 10-275046 | 10/1998 |
| JP | 11021274 | 1/1999 |
| JP | 11028406 | 2/1999 |
| JP | 1999-338858 | 12/1999 |
| JP | 2001-043205 | 2/2001 |
| JP | 2001-282778 | 10/2001 |
| JP | A 2003-500771 | 1/2003 |
| KR | 2001-0107388 | 12/2001 |
| KR | 20020004419 | 1/2002 |
| TW | 498264 B | 8/2002 |
| WO | WO 98/16889 | 4/1998 |
| WO | WO 99/15952 | 4/1999 |
| WO | WO 00/72300 | 11/2000 |
| WO | WO 0074240 | 12/2000 |
| WO | WO 03/021788 | 3/2003 |
| WO | WO 2004/111812 | 12/2004 |
| WO | WO 2004/111871 | 12/2004 |
| WO | WO 2006/026908 | 2/2006 |

OTHER PUBLICATIONS

Amin, A., et al., "Recognition of Hand-printed Chinese Characters Using Decision Trees/Machine Learning of C4.5 System," 1998, Pattern Analysis and Applications, pp. 130-141, vol. 1, Issue 2.

Chen, Ju-Wei, et al., "A Hierarchical Representation for the Reference Database of On-Line Chinese Character Recognition," Aug. 20-23, 1996, INSPEC Abstract No. C9702-1250B-021.

Cheng, Rei-Heng, et al., "Recognition of Radicals in Handwritten Chinese Characters By Means of Problem Reduction and Knowledge Guidance," Sep. 1996, International Journal of Pattern Recognition and Artificial Intelligence, INSPEC Abstract No. C9706-5260B-280.

Chou, Kuo-Sen, et al., "Radical-Based Neighboring Segment Matching for On-Line Chinese Character Recognition," Aug. 25-26, 1996, Proceedings of the 13$^{th}$ International Conference on Pattern Recognition; INSPEC Abstract No. B9701-6140C-682, C9701-1250B-019.

Chou, Kuo-Sen, et al., "Radical-Based Neighboring Segment Matching for On-Line Chinese Character Recognition"; Apr. 1997, Computer Processing of Oriental Languages, INSPEC Abstract No. B9701-6140C-682, C9701-1250B-019.

Connell, S., et al., "Template-based Online Character Recognition"; Aug. 10, 1999; Department of Computer Science and Engineering, Michigan State University, East Lansing, Michigan.

Fan, Fang, et al., "An On-Line Handwritten Chinese Character Recognition System", Jan. 26-27, 2000, Proceedings of the SPIE—The International Society for Optical Engineering, INSPEC Abstract No. C2000-12-5260B-085.

Hung, Kwok-Wah, et al., "Boxing Code for Stroke-Order Free Handprinted Chinese Characters Recognition"; Oct. 8-11, 2000, Proceedings of IEEE International Conference on Systems, Man, Cybernetics, INSPEC Abstract No. C2001-01-5260B-087.

Kim, Ki-Cheol, et al., "On-Line Recognition of Stroke-Order Free Cursive Chinese Characters with Relaxation Matching", Mar. 1995; Journal of the Korea Information Science Society, INSPEC Abstract No. C9507-1250B-022.

Li, Xiaolin, et al., "On-Line Handwritten Alphanumeric Character Recognition Using Feature Sequences", 1995; Department of Computer Science, Hong Kong University of Science and Technology, Clear Water Bay, Kowloon, Hong Kong.

Lin, Chang-Keng, et al., "Stroke-Order Independent On-Line of Handwritten Chinese Characters"; Nov. 8-10, 1989, Proceedings of the SPIE—The International Society for Optical Engineering, INSPEC Abstract No. C90031813.

Liu, J.Z., et al., "Two-layer Assignment Method for Online Chinese Character Recognition", Feb. 2000, IEEE Proceedings-Vision, Image and Signal Processing, INSPEC Abstract No. C2000-06-1250B-004.

Liu, Jianzhuang, et al., "Stroke Order and Stroke Number Free On-Line Chinese Character Recognition Using Attributed Relational Graph Matching", Aug. 25-29, 1996 Proceedings of the 13$^{th}$ International Conference on Pattern Recognition, INSPEC Abstract No. C9701-1250B-035.

Naito, S., et al., "Rough Classification for Handprinted Chinese Characters by Stroke Density"; Aug. 1981; Transactions of the Institute of Electronics and Communication Engineers of Japan, INSPEC Abstract No. C82009693.

Nambu, H., et al., "On-Line Chinese Handwriting Character Recognition: Comparison with Japanese Kanji Recognition and Improvement of Input Efficiency", Aug. 1999; Transactions of the Information Processing Society of Japan, INSPEC Abstract No. B2000-01-6135E-035, C2000-01-5260B-099.

Odaka, K., et al., "Stroke Order Free On-Line Handwritten Character Recognition of Algorithm", Jun. 1982, Transactions of the Institute of Electronics and Communication Engineers of Japan, Section E, INSPEC Abstract No. C82041007.

Pan, Bao-Chang, et al., "Recognition of Handprinted Chinese Characters by Stroke Order Codes", Aug. 29-Sep. 1, 1988, International Conference on Computer Processing of Chinese and Oriental Languages, INSPEC Abstract No. C89024386.

Park, Hee-Seon, et al., "An On-line Recognition System for Cursive Chinese Characters with Effective Coarse Classification and Elastic Matching", Sep. 1993, Journal of the Korea Information Science Society, INSPEC Abstract No. C9404-1250B-001.

Romero, R., et al., "Optical Chinese Character Recognition using Probabilistic Neural Networks", Jul. 1996; Imaging Systems Lab, Robotics Institute, Carnegie Mellon University, Pittsburgh, PA, pp. 1-18.

Seni, G., et al., "Large Vocabulary Recognition of On-Line Handwritten Cursive Words", Jun. 1996; presented at IEEE Transactions on Pattern Analysis and Machine Intelligence.

Shin, J., "Online Handwriting Character Analysis Using Stroke Correspondence Search," Sep. 2001, Journal of Shanghai University, Aizu University, Fukushima, Japan, INSPEC Abstract No. C2001-11-1250B-012.

Srihari, S., et al., "Cherry Blossom: A System for Japanese Character Recognition," 1997; Center for Excellence for Document Analysis and Recognition, State University of New York at Buffalo, Buffalo, NY.

Stockton, R. et al., "JKanji: Wavelet-based Interactive Kanji Competition," Sep. 3-7, 2000, Proceedings of the 15$^{th}$ International Conference on Pattern Recognition.

"Quick Stroke Information," Synaptics, retrieved on Nov. 18, 2006 from website: www.synaptics.com/products/quickstroke_faq.cfm and www.synaptics.com/products/quickstroke.cfm.

Vuurpijl, L. et al., "Coarse Writing-Style Clustering Based on Simple Stroke-Related Features," 1997; Institute for Cognition and Information, University of Nijmegen, Nijmegen, the Netherlands.

Zheng, Jing, et al., "Recognizing On-Line Handwritten Chinese Character Via FARG Matching," Aug. 18-20, 1997, Proceedings of the Fourth International Conference on Document Analysis and Recognition, INSPEC Abstract No. B9711-6140C-162, C971-5260B-123.

Shumin Zhai and Per-Ola Kristensson, *Shorthand Writing on Stylus Keyboard*, Apr. 5-10, 2003, CHI 3003, 5(1): 97-104, 2003.

Jennifer Mankoff and Gregory D. Abowd, *Error Correction Techniques for Handwriting, Speech and other Ambiguous or Error Prone Systems*, Jun. 1999; GVU TechReport, GIT-GVU-99-18.

Jennifer Mankoff and Gregory D. Abowd, *Cirrin: A Word-Level Unistroke Keyboard for Pen Input*, Nov. 1-4, 1998; Proceedings of UIST 1998, Technical note. pp. 213-214.

K. Perlin, *Quikwriting: Continuous Stylus-Based Text Entry*; Nov. 1-4, 1998 presented at ACM UIST'98 Conference, pp. 215-216.

M. Garrett, D. Ward, I. Murray, P. Cowans, and D. Mackay, *Implementation of Dasher, an Information Efficient Input Mechanism*; Jul. 11, 2003; presented at LINUX 2003 Conference, Edinburgh, Scotland.

P. Isokoski and R. Raisamo, *Device Independent Text Input: A Rationale and an Example*; May 23-26, 2000;Proceedings of the Working Conference on Advanced Visual Interfaces AVI2000, pp. 76-83, Palermo, Italy, 2000.

P. Isokoski, *Text Input Methods for Eye Trackers Using Off-Screen Targets*; Nov. 6-8, 2000; In Proceedings of *Eye Tracking Research & Applications Symposium 2000*, pp. 15-21. ACM, 2000.

P. Isokoski, *Model for Unistroke Writing Time*; Mar. 31-Apr. 5, 2001; CHI Letters: Human Factors in Computing Systems, SIGCHI 2001, 3(1):357-364, 2001.

P. Isokoski and M. Käki. *Comparison of Two Touchpad-Based Methods for Numeric Entry*; Apr. 20-25, 2002; CHI Letters: Human Factors in Computing Systems, CHI 2002, 4(1): 25-32.

P. Isokoski and I. Scott MacKenzie, *Text Entry on Mobile Systems: Directions for the Future*; Mar. 31-Apr. 5, 2001;CHI 2001 Extended Abstracts, p. 495.

P. Isokoski and I. S. MacKenzie; *Report on the CHI2001 Workshop on Text Entry on Mobile Systems*; Sep./Oct. 2001; SIGCHI Bulletin, p. 14.

P. Isokoski and I. S. MacKenzie. *Combined Model for Text Entry Rate Developmen*; Apr. 5-10, 2003; CHI2003 Extended Abstracts, pp. 752-753.

P. Isokoski and R. Raisamo, *Architecture for Personal Text Entry Methods*; 2003; In *Closing the Gap: Software Engineering and Human-Computer Interaction*, pp. 1-8. IFIP.

*Handbook for the Palm V™ Organizer*; 1998-1999; Palm Computing, Inc., Santa Clara, CA.

Masui, T.; "An Efficient Text Input method for Pen-based Computers"; Apr. 1998; Proceedings of the ACM Conf. on Human Factors in Computing Systems (CHI'98), ACM Press, pp. 328-335.

Masui, T.; "POBox: An Efficient Text Input Method for Handheld and Ubiquitous Computers"; Apr. 1998; Sony Computer Science Laboratories.

Pilot POBox (1997/7); Printout form dated Mar. 20, 2001 from http://www.csl.sony.co.jp/person/maui/P0Box/ilot.html; no translation provided.

POBox Example2: Printout form dated Mar. 20, 2001 from http://www.csl.sony..co.jp/person/masui/POBox/example2.html; no translation provided.

Softava Q12 Mobile's Keypad; Printout dated Oct. 24, 2006; http://www.softava.com/q12.

* cited by examiner

KEYBOARD SYSTEM WITH AUTOMATIC CORRECTION

CROSS REFERENCE TO RELATED APPLICATIONS

This application is a Continuation of U.S. patent application Ser. No. 11/090,464 filed Mar. 25, 2005, now U.S. Pat. No. 7,277,088 which is a Divisional of U.S. patent application Ser. No. 10/775,483, filed on Feb. 9, 2004, now U.S. Pat. No. 7,088,345 and entitled Keyboard System With Automatic Correction, which is incorporated herein in its entirety by this reference made thereto.

TECHNICAL FIELD OF THE INVENTION

The invention provides keyboard systems that auto-correct "sloppy" text input due to errors in touching a keyboard or screen. More specifically, the invention provides a reduced keyboard such as those implemented on a touch-sensitive panel or display screen and to mechanical keyboard systems, using word-level analysis to resolve inaccuracies (sloppy text entry) in user entries. This invention is in the field of keypad input preferably for small electronic devices.

BACKGROUND OF THE INVENTION

For many years, portable computers have been getting smaller and smaller. The principal size-limiting component in the effort to produce a smaller portable computer has been the keyboard. If standard typewriter-size keys are used, the portable computer must be at least as large as the keyboard. Miniature keyboards have been used on portable computers, but the miniature keyboard keys have been found to be too small to be easily or quickly manipulated with sufficient accuracy by a user.

Incorporating a full-size keyboard in a portable computer also hinders true portable use of the computer. Most portable computers cannot be operated without placing the computer on a flat work surface to allow the user to type with both hands. A user cannot easily use a portable computer while standing or moving. In the latest generation of small portable computers, called Personal Digital Assistants (PDAs), companies have attempted to address this problem by incorporating handwriting recognition software in the PDA. A user may directly enter text by writing on a touch-sensitive panel or display screen. This handwritten text is then converted into digital data by the recognition software. Unfortunately, in addition to the fact that printing or writing with a pen is in general slower than typing, the accuracy and speed of the handwriting recognition software has to date been less than satisfactory. To make matters worse, today's handheld computing devices which require text input are becoming smaller still. Recent advances in two-way paging, cellular telephones, and other portable wireless technologies has led to a demand for small and portable two-way messaging systems, and especially for systems which can both send and receive electronic mail ("e-mail").

It would therefore be advantageous to develop a much smaller keyboard for entry of text into a computer. As the size of the keyboard is reduced, the user encounters greater difficulty selecting the character of interest. In general there are two different types of keyboards utilized in such portable devices. One is the familiar mechanical keyboard consisting of a set of mechanical keys that are activated by depressing them with a finger or thumb. However, these mechanical keyboards tend to be significantly smaller than the standard sized keyboards associated with typewriters, desktop computers, and even "laptop" computers. As a result of the smaller physical size of the keyboard, each key is smaller and in closer proximity to neighboring keys. This increases the likelihood that the user will depress an unintended key, and the likelihood of keystroke errors tends to increase the faster the user attempts to type.

Another commonly used type of keyboard consists of a touch-sensitive panel on which some type of keyboard overlay has been printed, or a touch-sensitive display screen on which a keyboard overlay can be displayed. Depending on the size and nature of the specific keyboard, either a finger or a stylus can be used to contact the panel or display screen within the area associated with the key that the user intends to activate. Due to the reduced size of many portable devices, a stylus is often used in order to attain sufficient accuracy in contacting the keyboard to activate each intended key.

Here again, the small overall size of such keyboards results in a small area being associated with each key so that it becomes quite difficult for the average user to type quickly with sufficient accuracy.

One area of prior development in mechanical keyboards has considered the use of keys that are much smaller than those found on common keyboards. With smaller keys, the user must take great care in controlling each key press. One approach (U.S. Pat. No. 5,612,690) proposes a system that uses up to four miniature keys in unison to define primary characters (the alphabet) and nests secondary character rows (like numbers) between primary character rows. Selecting a secondary character involves depressing the miniature key from each of the surrounding primary characters. Grouping the smaller keys in this fashion creates a larger apparent virtual key composed of four adjacent smaller keys, such that the virtual key is large enough to be depressed using a finger. However, the finger must contact the keys more or less precisely on the "cross-hairs" of the boundaries between the four adjacent keys in order to depress them in unison. This makes it still difficult to type quickly with sufficient accuracy.

Another area of prior development in both touch screen and mechanical keyboards has considered the use of a much smaller quantity of full-size keys. With fewer keys, each single key press must be associated with a plurality of letters, such that each key activation is ambiguous as to which letter is intended. As suggested by the keypad layout of a touch-tone telephone, many of the reduced keyboards have used a 3-by-4 array of keys, where each key is associated with three or four characters (U.S. Pat. No. 5,818,437). Several approaches have been suggested for resolving the ambiguity of a keystroke sequence on such a keyboard. While this approach has merit for such keyboards with a limited number of keys, it is not applicable to reduced size keyboards with a full complement of keys.

Another approach in touch screen keyboards has considered analyzing the immediately preceding few characters in order to determine which character should be generated for a keystroke that is not close to the center of the display location of a particular character (U.S. Pat. No. 5,748,512). When the keyboard is displayed on a small touch screen, keystrokes that are off-center from a character are detected. Software compares the possible text strings of probable sequences of two or three typed characters against known combinations, such as a history of previously typed text or a lexicon of text strings rated for their frequency within a context. When the character generated by the system is not the character intended by the user, the user must correct the character before going on to select the a following character, because the generated character will be used to determine probabilities for the following keystroke.

The fundamental problem is that the specific activations that result from a user's attempts to activate the keys of a keyboard do not always precisely conform to the intentions of the user. On a touch screen keyboard, the user's finger or stylus may hit the wrong character or hit between keys in a boundary area not associated with a specific character. With a miniaturized mechanical keyboard, a given keypress may activate the wrong key, or may activate two or more keys either simultaneously or with a "roll-over" motion that activates adjacent keys in a rapid sequence. Other examples include common keyboards operated by users with limited ranges of motion or motor control, where there is a limited ability to consistently strike any particular space or key, or where the limb (such as in the case of an amputee, or the use of gloved hands or gloved fingers) or the device used to make the entry (such as a stylus) is far larger than the targeted key or character space.

SUMMARY OF THE INVENTION

The present invention provides an enhanced text entry system that uses word-level disambiguation to automatically correct inaccuracies in user keystroke entries. Specifically, the present invention provides a text entry system comprising:

(a) a user input device comprising a touch sensitive surface including an auto-correcting keyboard region comprising a plurality of the characters of an alphabet, wherein each of the plurality of characters corresponds to a location with known coordinates in the auto-correcting keyboard region, wherein each time a user contacts the user input device within the auto-correcting keyboard region, a location associated with the user contact is determined and the determined contact location is added to a current input sequence of contact locations;

(b) a memory containing a plurality of objects, wherein each object is a string of one or a plurality of characters forming a word or a part of a word, wherein each object is further associated with a frequency of use;

(c) an output device with a text display area; and (d) a processor coupled to the user input device, memory, and output device, said processor comprising:

(i) a distance value calculation component which, for each determined contact location in the input sequence of contacts, calculates a set of distance values between the contact locations and the known coordinate locations corresponding to one or a plurality of characters within the auto-correcting keyboard region;

(ii) a word evaluation component which, for each generated input sequence, identifies one or a plurality of candidate objects in memory, and for each of the one or a plurality of identified candidate objects, evaluates each identified candidate object by calculating a matching metric based on the calculated distance values and the frequency of use associated with the object, and ranks the evaluated candidate objects based on the calculated matching metric values; and (iii) a selection component for (a) identifying one or a plurality of candidate objects according to their evaluated ranking, (b) presenting the identified objects to the user, enabling the user to select one of the presented objects for output to the text display area on the out device.

Preferably, the selection component further comprises (c) resetting the current input sequence of contact locations to an empty sequence upon detecting the selection by the user of one of the presented objects for output to the text display area on the output device.

Preferably, (a) each of the plurality of objects in memory is further associated with one or a plurality of predefined groupings of objects; and (b) the word evaluation component, for each generated input sequence, limits the number of objects for which a matching metric is calculated by identifying one or a plurality of candidate groupings of the objects in memory, and for one or a plurality of objects associated with each of the one or a plurality of identified candidate groupings of objects, calculates a matching metric based on the calculated distance values and the frequency of use associated with each candidate object, and ranks the evaluated candidate objects based on the calculated matching metric values. This reduces the calculation required since, conversely, one or more groupings of objects are identified as containing no candidate objects for a given input sequence of contacts, such that a matching metric need not be calculated for any object in the groupings so identified.

Preferably, the characters of the alphabet are arranged on the auto-correcting keyboard region in approximately a standard "QWERTY" layout. Most preferably, the width to height ratio of the auto-correcting keyboard region is approximately 2 to 1, or the width to height ratio of the auto-correcting keyboard region is less than 2 to 1. In one embodiment, one or a plurality of the characters arranged on the auto-correcting keyboard region are illegible.

Preferably, the auto-correcting keyboard region includes one or a plurality of known locations associated with one or a plurality of punctuation characters, wherein the memory includes one or a plurality of objects in memory which include one or a plurality of the punctuation characters associated with locations in the auto-correcting keyboard region. Preferably, the objects in memory are further associated with one or a plurality of modules, wherein each module comprises a set of objects with one or a plurality of common characteristics. In one embodiment, the text entry system comprises a module selector whereby a user can determine which modules are to be evaluated by the word evaluation component in order to identify candidate objects. In another embodiment, the plurality of modules comprises word stem modules and suffix modules, wherein each word stem module comprises a logical organization of uninflected word stem objects, and wherein each suffix module comprises a logical organization of suffixes which can be appended to word stems to form inflected words, whereby each word stem module is associated with one or a plurality of suffix modules, whereby whenever the word evaluation component calculates a matching metric value for a given word stem in a given word stem module with respect to an initial sequence of contacts within an input sequence such that the calculated matching metric value ranks higher than a predetermined threshold, the word evaluation component evaluates the remaining contacts of the input sequence with respect to the associated suffix modules, whereby whenever the word evaluation component calculates a matching metric value for a given suffix in one of said associated suffix modules that ranks higher than a second predetermined threshold, said suffix is appended to said word stem to form a completed word corresponding to a matching metric value that is a function of said determined word stem matching metric value and said determined suffix matching metric value.

Preferably, the word evaluation component calculates the matching metric for each candidate object by summing the distance values calculated from each contact location in the input sequence to the location assigned to the character in the corresponding position of the candidate object, and applying a weighting function according to the frequency of use associated with the object. In addition, each character of the alphabet associated with the auto-correcting keyboard region is assigned a Cartesian coordinate and wherein the distance value calculation component calculates the distance between the contact location and the location corresponding to a character according to standard Cartesian coordinate distance analysis. Further, each character of the alphabet associated with the auto-correcting keyboard region is assigned a Cartesian coordinate and wherein the distance value calculation component calculates the distance between the contact location and the location corresponding to a character as the square of the standard Cartesian coordinate distance. The distance values are placed in a table. In addition, each location on the auto-correcting keyboard region is defined by a horizontal and a vertical coordinate, and wherein the distance value between a contact location and the known coordinate location corresponding to a character comprises a horizontal and a vertical component, wherein the vertical component is adjusted by a weighting factor in calculating the distance of the contact location from the character. The word evaluation component adds an increment value to the sum of the distance values prior to applying a weighting function according to the frequency of use associated with the candidate object. Most preferably, the increment value is a fixed value that is approximately twice the average distance between adjacent locations on the auto-correcting keyboard region corresponding to characters. The frequency of use associated with each candidate object in memory comprises the ordinal ranking of the object with respect to other objects in memory, wherein an object associated with a higher relative frequency corresponds to a numerically lower ordinal ranking. Most preferably, the frequency weighting function applied by the word evaluation component to the summed distance values for a candidate object comprises multiplying the sum of the distance values by the base 2 logarithm of the ordinal ranking of the object.

Preferably, objects in memory are stored such that the objects are classified into groupings comprising objects of the same length. The word evaluation component limits the number of objects for which a matching metric is calculated by initially identifying candidate groupings of objects of the same length as the number of inputs in the input sequence. Most preferably, if fewer than a threshold number of candidate objects are evaluated to have a matching metric score better than a threshold value, the word evaluation component identifies candidate groupings of objects of progressively longer lengths and calculates the matching metric for the objects in the identified groupings until said threshold number of candidate objects are evaluated to have a matching metric score better than said threshold. Further, the word evaluation component calculates the matching metric for each candidate object by summing the distance values calculated from each contact location in the input sequence to the location assigned to the character in the corresponding position of the candidate object and adding an increment value, and applying to this sum a weighting function according to the frequency of use associated with the object, and wherein the increment value added to the sum of the distance values is a value that is based on the difference between the number of characters in the candidate object and the number of inputs in the current input sequence.

Preferably, the word evaluation component calculates the matching metric for each candidate object by summing the distance values calculated from each contact location in the input sequence to the location assigned to the character in the corresponding position of the candidate object, and applying a weighting function according to the frequency of use associated with the object. Most preferably, the frequency of use associated with each candidate object in memory comprises the ordinal ranking of the object with respect to other objects in one or a plurality of sub-groupings in memory with which said object is associated, wherein an object associated with a higher relative frequency corresponds to a numerically lower ordinal ranking. In addition, for each calculated distance value between a contact location in the input sequence and the known coordinate location corresponding to a character within the auto-correcting keyboard region wherein said calculated distance exceeds a threshold distance value, for each object in memory in which said character occurs at a position in the sequence of the characters of said object corresponding to the position of said contact location in said input sequence, said object is ranked by the word evaluation component as an object that is excluded from presentation to the user for selection. One or a plurality of the identified candidate groupings of the objects in memory comprise objects that are excluded from presentation to the user for selection, wherein at least one of the calculated distance values included in the calculated sum of distance values for each object in said one or identified candidate groupings of objects exceeds a threshold distance value. The auto-correcting keyboard region is separated into two or more predefined clustering regions, each of which contains the known locations of one or a plurality of characters, and wherein each objects in memory is assigned to a predefined group according to which of said two or more predefined clustering regions contain the known locations corresponding to one or a plurality of the initial characters of said object. In one embodiment, the auto-correcting keyboard region is separated into three predefined clustering regions, and wherein each object in memory is assigned to one of nine predefined groupings based which of the three predefined clustering regions contain the known locations corresponding to each of the first two characters of said object.

Preferably, for each character corresponding to a known location in the auto-correcting keyboard region, a region is predefined around one or a plurality of said known locations wherein the distance between an input contact location falling within said predefined region and the known character location within said predefined region is calculated as a distance of zero. Most preferably, the relative sizes of said predefined regions correspond to the relative frequencies of occurrence of the characters associated with the known locations within said predefined regions. The predefined region around the known location of a character corresponds to a displayed key on the touch screen. Further, at least one of the locations with known coordinates in the auto-correcting keyboard region corresponds to a plurality of characters, one or a plurality of which include various diacritic marks, wherein the plurality of characters comprise variant forms of a single base character, and wherein objects in memory are stored with their correct accented characters.

Preferably, the selection component presents the identified one or a plurality of candidate objects for selection by the user in a candidate object list in the text display area. Most preferably, the selection component identifies the highest ranked candidate object and presents the identified object in the candidate object list in the position nearest to the auto-correcting keyboard region. In addition, user selection of a character that is associated with a contact outside of the auto-correcting keyboard region accepts and outputs the determined highest ranked candidate object at a text insertion point in the text display area prior to outputting the selected character at the text insertion point in the text display area. The user selection of an object for output at a text insertion point in the text display area terminates the current input sequence such that the next contact within the auto-correcting keyboard region starts a new input sequence. In addition, the selection component detects a distinctive manner of selection that is used to select a candidate object, and wherein upon detecting that an object has been selected through said distinctive manner, the system replaces the current input sequence of actual contact locations with an input sequence of contact locations corresponding to the coordinate locations of the characters comprising the selected object, and wherein a next contact in the auto-correcting keyboard region is appended to the current input sequence.

Preferably, the word evaluation component determines, for each determined contact location in each input sequence of contact locations, the closest known location corresponding to a character, and constructs an exact typing object composed of said determined corresponding characters in the order corresponding to the input sequence of contact locations. Most preferably, for each input sequence of contact locations, the selection component presents said exact typing object to the user for selection. Further, when the user selects said exact typing object for output to the text display area on the output device and said exact typing object is not already included as one of the objects in memory, said exact typing object is added to the memory. Prior to displaying the exact typing object to the user for selection, the selection component compares the exact typing object to a database of offensive objects, each of which is associated with an acceptable alternative object for display, and if a match is found, replaces the exact typing object with the associated acceptable object for presentation to the user.

Preferably, the selection component identifies the highest ranked candidate object and presents the identified object at the text insertion point in the text display area on the output device. Most preferably, the text entry system includes a select key region associated with an object selection function, wherein when said select key region is contacted, the object presented at the text insertion point in the text display area on the output device is replaced with next highest ranked object of the identified one or a plurality of candidate objects.

Preferably, the text entry system includes a delete key region associated with a delete function, wherein when the current input sequence includes at least one contact and said delete key region is contacted, the last input contact from the current input sequence of contacts is deleted, without terminating the current input sequence. In another preferred embodiment, the text entry system includes an Edit Word key region associated with an Edit Word function, wherein when no current input sequence exists and said Edit Word key region is contacted:

(i) when the text insertion point in the text display area on the output device is contained within a previously output word, the system establishes a new current input sequence consisting of a sequence of contact locations corresponding to the coordinate locations associated with the characters of said word, and (ii) when the text insertion point in the text display area on the output device is located between two previously output words, the system establishes a new current input sequence consisting of a sequence of contact locations corresponding to the coordinate locations associated with the characters of the word adjacent to the text insertion point, and wherein the text entry system processes said new current input sequence and determines a corresponding ranking of new candidate objects, and wherein selection of one of the new candidate objects replaces the previously output word used to establish said new current input sequence.

Preferably, as the user enters an input sequence by performing a sequence of contact actions within the auto-correcting keyboard region, the processor determines the location associated with each user contact action by recording each contact action in the sequence as an indexed primary set of a fixed number of two or more regularly spaced contact points along the path traced out by the user contact action, and by assembling two or more corresponding secondary sets of contact points by taking, for each of the two or more possible primary index values, the sequence of contact points having the same index value, one from each recorded indexed primary set of contact points, and by determining with respect to each word is selected by the user for output, a minimizing primary index value that identifies the assembled secondary set of contact points for which the calculated distance between the assembled secondary set of contact points and the known locations corresponding to the characters of the selected word is minimized, and whereby for a next input sequence of user contact actions, the distance value calculation component calculates distance values based on a sequence of contact locations determined as the secondary set of contact point locations assembled from said next input sequence of contact actions corresponding to the determined minimizing primary index value. Most preferably, for a plurality of user input sequences, the distance value calculation component computes a running average of the distance calculations for each of the two or more assembled secondary sets corresponding to the two or more primary index values, and whereby for a next input sequence of contact actions, the distance value calculation component calculates distance values based on a sequence of contact locations determined as the secondary set of contact point locations assembled from said next input sequence of contact actions corresponding to the minimizing primary index value determined with respect to said computed running averages. Further, for each primary index value, the distance value calculation component computes a running average of the horizontal and vertical components of the offset of the coordinate location corresponding to each character of each selected word with respect to the coordinate location of each corresponding recorded indexed contact point, and wherein in performing distance calculations for the word evaluation component, the distance value calculation component adjusts the horizontal and vertical coordinates of each recorded indexed contact point by an amount that is a function of the average horizontal and vertical offsets computed with respect to the corresponding primary index value.

Preferably, for each input contact location, the distance value calculation component computes a running average of the horizontal and vertical components of the offset of the coordinate location corresponding to each character of each selected word with respect to the coordinates of each corresponding input contact location, and wherein in performing distance calculations for the word evaluation component, the distance value calculation component adjusts the horizontal and vertical coordinates of each input contact location by amounts that are functions of the computed average signed horizontal and vertical offsets. Alternatively, the processor further comprises a stroke recognition component that determines for each user contact action within the auto-correcting keyboard region whether the point of contact is moved less than a threshold distance from the initial contact location prior to being lifted from the touch sensitive surface, whereby:

(a) when the point of contact is moved less than a threshold distance from the initial contact location prior to being lifted from the touch sensitive surface, the stroke recognition component determines that the user contact is a tap contact, and the location determined to be associated with the user contact is added to the current input sequence of contact locations to be processed by the distance value calculation component, the word evaluation component, and the selection component, and b) when the point of contact is moved greater than or equal to a threshold distance from the initial contact location prior to being lifted from the touch sensitive surface, the stroke recognition component determines that the user contact is one of a plurality of stroke contacts that are associated with known system functions, and classifies the stroke contact as one of the plurality of predefined types of stroke contacts.

Preferably, when a threshold number of contact locations in the input sequence are further than a threshold maximum distance from the corresponding character in the sequence of characters comprising a given candidate object, said object is identified as no longer being a candidate object for the selection component. Alternatively, the processor further comprises a frequency promotion component for adjusting the frequency of use associated with each object in memory as a function of the number of times the object is selected by the user for output to the text display area on the output device. Moreover, the frequency of use associated with each object in memory comprises the ordinal ranking of the object with respect to other objects in memory, wherein an object associated with a higher relative frequency corresponds to a numerically lower ordinal ranking, and wherein when an object is selected for output by the user, the frequency promotion component adjusts the ordinal ranking associated with said selected object by an amount that is a function of the ordinal ranking of said object prior to said adjustment. Further, the function used by the frequency promotion component to determine the amount by which the ordinal ranking associated with a selected object is adjusted reduces said amount for objects with ordinal rankings that are associated with relatively higher frequencies of use. The frequency promotion component analyzes additional information files that are accessible to the text entry system to identify new objects contained in said files that are not included among the objects already in said memory of said text entry system, and wherein said newly identified objects are added to the objects in memory as objects that are associated with a low frequency of use. Further, the frequency of use associated with a newly identified object that is added to the objects in memory is adjusted by the frequency promotion component as a function of the number of times that the newly identified object is detected during the analysis of said additional information files.

Preferably, the processor further comprises a frequency promotion component for adjusting the frequency of use associated with each object in memory as a function of the number of times the object is selected by the user for output to the text display area on the output device with respect to other objects associated with the same predefined grouping. Most preferably, when an object is selected by the user for output to the text display area on the output device, the frequency promotion component increases the value of the frequency associated with the selected object by a relatively large increment, and decreases by a relatively small decrement the frequency associated with unselected objects that are associated with the same grouping as the selected object. Alternatively, information regarding the capitalization of one or a plurality of objects is stored along with the objects in memory and wherein the selection component presents each identified object in a preferred form of capitalization according to the stored capitalization information. In another embodiment, one or a plurality of objects in memory are associated with a secondary object in memory comprising a sequence of one or a plurality of letters or symbols, and wherein when the selection component identifies one of said objects for presentation to the user based on the matching metric calculated by the word evaluation component, the selection component presents the associated secondary object for selection.

The present invention further provides a text entry system comprising:

(a) a user input device comprising a keyboard constructed with mechanical keys including an auto-correcting keyboard region comprising a plurality of keys, each corresponding to a character of an alphabet and each at a known coordinate location, wherein each time a user activates one or a plurality of adjacent keys in the auto-correcting keyboard region within a predetermined threshold period of time to generate a key activation event, a determined location corresponding to the key activation event is appended to a current input sequence of the determined locations of the key activation events;

(b) a memory containing a plurality of objects, wherein each object is a string of one or a plurality of characters forming a word or a part of a word, wherein each object is further associated with a frequency of use;

(c) an output device with a text display area; and (d) a processor coupled to the user input device, memory, and output device, said processor comprising:

(i) a distance value calculation component which, for each generated key activation event location in the input sequence of key activation events, calculates a set of distance values between the key activation event location and the known coordinate locations corresponding to one or a plurality of keys within the auto-correcting keyboard region;

(ii) a word evaluation component which, for each generated input sequence, identifies one or a plurality of candidate objects in memory, and for each of the one or a plurality of identified candidate objects, evaluates each identified candidate object by calculating a matching metric based on the calculated distance values and the frequency of use associated with the object, and ranks the evaluated candidate objects based on the calculated matching metric values; and (iii) a selection component for identifying one or a plurality of candidate objects according to their evaluated ranking, presenting the identified objects to the user, and enabling the user to select one of the presented objects for output to the text display area on the output device.

Preferably, (a) each of the plurality of objects in memory is further associated with one or a plurality of predefined groupings of objects; and (b) the word evaluation component, for each generated input sequence, limits the number of objects for which a matching metric is calculated by identifying one or a plurality of candidate groupings of the objects in memory, and for one or a plurality of objects associated with each of the one or a plurality of identified candidate groupings of objects, calculates a matching metric based on the calculated distance values and the frequency of use associated with each candidate object, and ranks the evaluated candidate objects based on the calculated matching metric values. Further, the keys associated with the characters of the alphabet are arranged in the auto-correcting keyboard region in approximately a standard "QWERTY" layout.

Preferably, when a key activation event is detected comprising the simultaneous activation of a plurality of adjacent keys in the auto-correcting keyboard region, a location corresponding to said key activation event is determined as a function of the locations of the simultaneously activated keys, and said determined location is appended to the current input sequence of the locations of the key activation events. Most preferably, the function used to determine the location of said key activation event comprises the computation of the location corresponding to the center of the locations of the simultaneously activated keys. Further, the function used to determine the location of said key activation event comprises the computation of the location corresponding to the weighted center of gravity of the locations of the simultaneously activated keys, wherein the weights associated with each of the keys in the auto-correcting keyboard region correspond to the relative frequencies of occurrence of the characters associated with the keys, wherein said relative frequencies are determined with respect to the frequencies of occurrence of the characters in the objects in memory.

Preferably, when a key activation event is detected comprising the activation of a plurality of adjacent keys in the auto-correcting keyboard region within a predetermined threshold period of time, wherein at all times during said key activation event at least one of said plurality of adjacent keys is activated and wherein at any moment during said key activation event that any subset of said plurality of keys is simultaneously activated, said simultaneously activated subset of keys comprises keys that are contiguously adjacent, a location corresponding to said key activation event is determined as a function of the locations of the entire plurality of adjacent keys detected during said key activation event, and said determined location is appended to the current input sequence of the locations of the key activation events. Most preferably, the function used to determine the location of said key activation event comprises the computation of the location corresponding to the center of the locations of the simultaneously activated keys. Further, the function used to determine the location of said key activation event comprises the computation of the location corresponding to the weighted center of gravity of the locations of the simultaneously activated keys, wherein the weights associated with each of the keys in the auto-correcting keyboard region correspond to the relative frequencies of occurrence of the characters associated with the keys, wherein said relative frequencies are determined with respect to the frequencies of occurrence of the characters in the objects in memory.

Preferably, the auto-correcting keyboard region includes one or a plurality of keys associated with one or a plurality of punctuation characters, wherein said memory includes one or a plurality of objects in memory which include one or a plurality of the punctuation characters associated with keys in said auto-correcting keyboard region. Alternatively, the word evaluation component calculates the matching metric for each candidate object by summing the distance values calculated from determined location in the input sequence to the known location of the key corresponding to the character in the corresponding position of the candidate object, and applying a weighting function according to the frequency of use associated with the object. In another embodiment, at least one of the keys in the auto-correcting keyboard region corresponds to a plurality of characters, one or a plurality of which include various diacritic marks, wherein the plurality of characters comprise variant forms of a single base character, and wherein objects in memory are stored with their correct accented characters.

Preferably, the selection component presents the identified one or a plurality of candidate objects for selection by the user in a candidate object list in the text display area. Most preferably, the selection component identifies the highest ranked candidate object and presents the identified object in the candidate object list in the position nearest to the auto-correcting keyboard region. Further, activation of a key that is associated with a character, wherein the key is not included within the auto-correcting keyboard region, accepts and outputs the determined highest ranked candidate object at a text insertion point in the text display area prior to outputting the selected character at the text insertion point in the text display area. Further, the user selection of an object for output at a text insertion point in the text display area terminates the current input sequence such that the next key activation event within the auto-correcting keyboard region starts a new input sequence.

DETAILED DESCRIPTION OF THE INVENTION

Figure 1A:
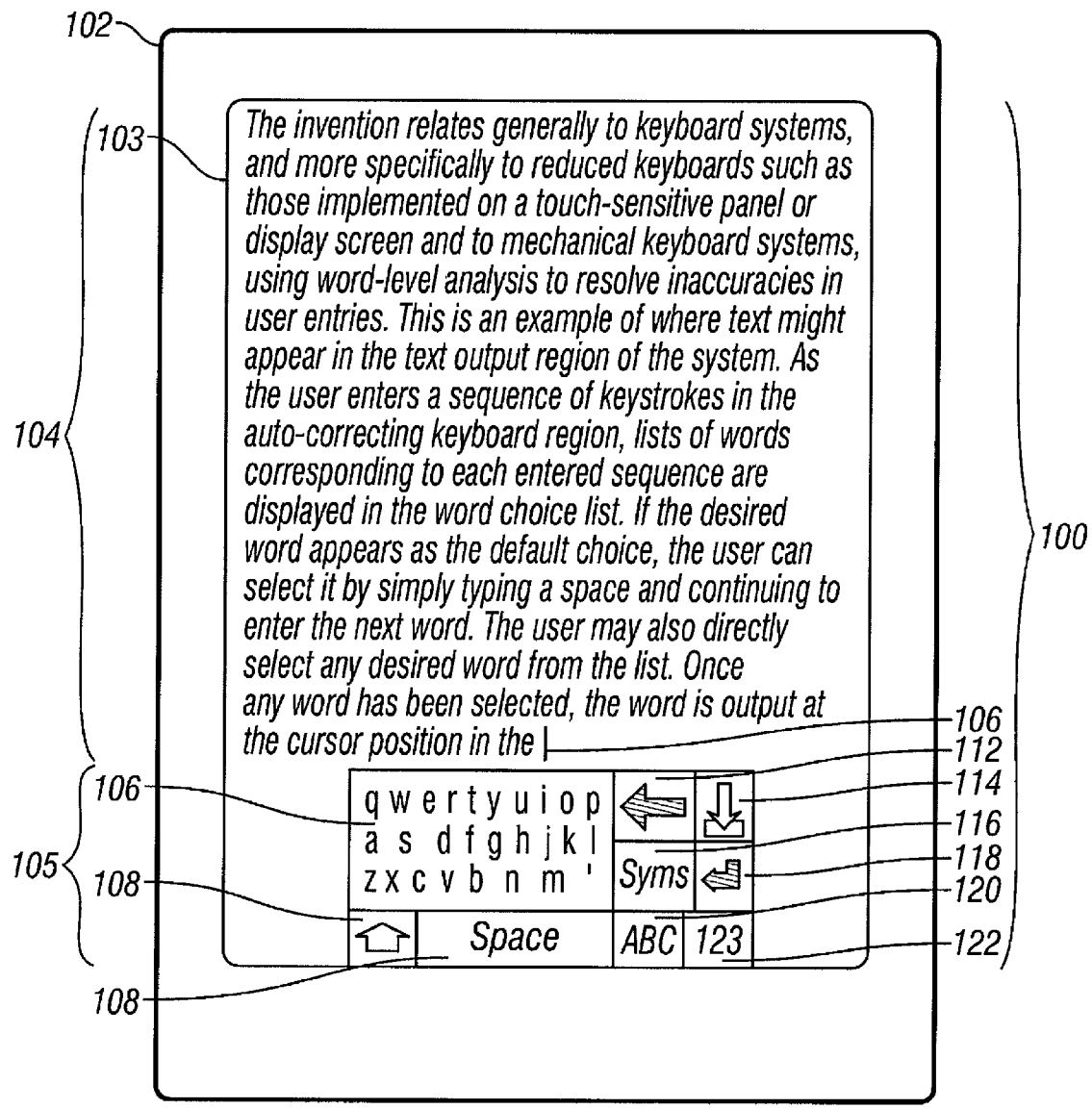
FIG. 1A is a schematic view of a preferred embodiment of a portable computer incorporating a reduced keyboard system of the present invention which automatically corrects input keystrokes.

Since user keystroke entries are presumed to be possibly inaccurate, there is some ambiguity as to how a particular sequence of keystrokes should be interpreted in order to generate the sequence of characters that the user intended to type. The present invention provides a process and system (i.e., apparatus or device having the inventive software within) wherein the user is presented with one or more alternate interpretations of each keystroke sequence corresponding to a word such that the user can easily select the desired interpretation, and wherein no special action need be taken to select the interpretation deemed most likely. This approach enables the system to utilize the information contained in the entire sequence of keystrokes corresponding to a word in resolving what the user's likely intention was for each character of the sequence.

The method of the present invention has two very significant advantages over prior systems, such as that disclosed by U.S. Pat. No. 5,748,512. One is that the inventive system is able to utilize information regarding both preceding and succeeding keystrokes in determining the intended character for each keystroke, together with the length of the word and a database that includes information as to the relative frequencies of potentially matching words. This is far more information than can be utilized by prior systems, and greatly increases the performance of the system. The second advantage is that the user need only interact and respond to predictions by the system at word boundaries, after all the characters of each word have been entered, rather than having to examine, and accept or reject each character generated by the system immediately following each keystroke. This greatly enhances the usability of the system, since the user is thus able to focus much more on the entry of text on the keyboard without needing to constantly divert his attention to the display following each keystroke. Another advantage is the system also accommodates punctuation characters such as a hyphen or apostrophe that are commonly embedded in words such as hyphenated compounds and contractions in English. Such embedded punctuation characters can be associated with one or more keys or character locations included among those associated with alphabetic characters.

Definitions

"Keyboard" shall mean include any input device having defined areas including, but not limited to, a touch sensitive screen having a defined area containing a plurality of defined locations associated with characters, a touch sensitive screen having defined areas for keys, discrete mechanical keys, or membrane keys.

"Auto-correcting keyboard region" refers to that region of the keyboard having the inventive auto-correcting process and features applied.

"Object" shall mean a string of one or more characters forming a word, wordstem, prefix or suffix.

"Wordstem" shall mean a "root word." For example, the word "interestingly" consists of the root word "interest" to which the suffix "ingly" has been appended.

"Module" is a logical organization of objects based upon characteristics of the objects. For example, (1) words of the French language versus words of the English language are arranged in different modules, (2) a verb stem module contains verb stems to each of which one or more possible suffixes may be appended, wherein the suffixes are contained in one or more suffix modules associated with the verb stem module, wherein the suffixes from the suffix modules can be appended to a verb stem in the verb stem module to form a properly inflected word.

A "contact action" comprises the entirety of a user action which results in a contact with the keyboard, starting from the first point and moment of contact, and including any additional contiguous points of contact that are detected up to the moment at which contact with the keyboard is terminated. Examples of contact actions include, but are not limited to, physically touching a touch sensitive screen with a stylus or finger and moving the stylus or finger to a greater or lesser degree prior to lifting the stylus or finger from the screen, or moving a mouse cursor to position it within a displayed keyboard region and clicking the mouse button then moving the mouse cursor to a greater or lesser degree prior to releasing the mouse button.

A "contact location" is the location determined to correspond to a user action which results in a contact with the keyboard. Methods of determining a contact location include, but are not limited to, detecting the point on a touch screen or similar device where the initial or final contact was made by the user, or detecting a user action such as a mouse click whereby the contact location is determined corresponding to the location of the mouse cursor within a displayed keyboard region at the time of that the mouse button is first depressed.

A "distance value calculation component" calculates a set of distance values between a contact location and the known coordinate locations corresponding to one or more characters within the auto-correcting region of the keyboard. The method used to calculate the distance between two locations includes, but is not limited to, assigning Cartesian coordinates to each location and calculating the distance between two locations according to standard Cartesian coordinate distance analysis, assigning Cartesian coordinates to each location and calculating the distance between two locations as the square of the standard Cartesian coordinate distance, and assigning Cartesian coordinates to each location and calculating the distance between two locations according to Cartesian coordinate distance analysis where the vertical component is adjusted by a weighting factor.

A "matching metric" is a score calculated for an object with respect to an input sequence of contact locations as a means to estimate how likely it is that the object corresponds to the user's intention in performing the input sequence of contacts. For example, a matching metric can be calculated in one embodiment as the sum of the squares of the distances from each contact location in the entry sequence to the location assigned to the character in the corresponding position of a given candidate object, and then multiplying the sum of the squared distances by a frequency adjustment factor, which in one preferred embodiment is calculated as the base 2 logarithm of the ordinal position of the word with respect to other potential candidate objects, where objects associated with higher relative frequencies correspond to lower ordinal positions, i.e., the most frequent object is at position "1." Thus, in this embodiment, the lower the numeric value of the calculated matching metric, the more likely a given object is deemed to correspond to the user's intention in generating a sequence of contact points.

An "evaluated ranking" is the relative prioritization of a set of candidate objects according the likelihood that each of the objects corresponds to the user's intention in generating a sequence of contact points, where this likelihood is determined according to the matching metric calculated for the objects.

A "key activation event" includes but is not limited to an event that comprises the entirety of the activated keys detected during the course of a user action which results in the activation of one or more adjacent keys of a mechanical keyboard, starting from the first depressed key and including the time at which it was depressed, and including any additional keys that are adjacent to the first depressed key and that are simultaneously depressed, detected up to the moment at which neither the first key nor any simultaneously depressed adjacent key is depressed.

With regard to FIG. 1A, a reduced auto-correcting keyboard system 100 formed in accordance with the present invention is depicted incorporated in a palmtop portable computer 102. Portable computer 102 contains a reduced keyboard 105 implemented on a touch screen display 103, which is used to generate text to be output to text display region 104. For purposes of this application, the term "keyboard" is defined broadly to include any input device having defined areas including, but not limited to, a touch screen having defined areas for keys, discrete mechanical keys, or membrane keys. Keyboard 105 has an auto-correcting keyboard region 106 wherein the 26 letters of the English alphabet plus an apostrophe are displayed in approximately the standard "QWERTY" arrangement. In this preferred embodiment, it is relevant to note that the aspect ratio of the keyboard 106 (the ratio of its width to its height) is less than 2:1, whereas for a standard computer keyboard or typewriter, this ratio is approximately 4:1. This aspect ratio renders the keyboard 106 easier to use in that the less elongated shape tends to minimize the distance the stylus must be moved between letters at opposite ends of the keyboard, while enhancing the system's ability to distinguish between letters in adjacent rows by increasing their relative separation. This makes it easier for the user to contact the keyboard in a location that is relatively close to the intended letter in the vertical dimension. Consequently, in a preferred embodiment, the distance of a contact point from a letter is calculated using a method that increases the relative weight of the vertical component of the distance with respect to the horizontal component.

The keyboard may be of any size, very small or very large. For example, an implementation using a space for the auto-correcting keyboard as small as 1 cm by 0.5 cm that includes all 26 letters of the English alphabet has been found to be quite usable with a small plastic stylus. When embodied as a keyboard of this size, a well-known key arrangement such as the standard "QWERTY" layout may be used. With this key arrangement it is not necessary to include legible displayed characters, because the relative locations of each character in the defined keyboard space are well known to users familiar with such a standard layout. Alternatively, a very small label such as a dot may be displayed at each character location to aid the user.

In accordance with another aspect of the invention, the internal, logical representation of the characters need not mirror the physical arrangement represented by the labels on the actual characters in the auto-correcting keyboard. For example, in a database constructed to represent a French vocabulary module, the accented characters Â and À may also be associated with the unaccented character A that appears as an explicitly labeled key in a mechanical keyboard or character location in a keyboard implemented on a touch-sensitive display screen. The word entries in the French vocabulary module include the necessary information to determine whether a given word is spelled with an accented or unaccented character so that the correctly spelled form can be automatically generated based on an input contact point sufficiently near the key or character location associated with the unaccented character. This is a significant advantage for languages such as French that often use accented characters since no special typing techniques, additional keys, or additional keystrokes are required to type words using their correct spellings including appropriate accents.

The preferred keyboard of FIG. 1A contains six additional keys associated with the execution of specific functions or the generation of specific characters. These keys include a Shift key 108, a Space key 110, a BackSpace key 112, an Edit Word key 114, a Symbols Mode key 116, a Return (or "Enter") key 118, an Alternate Keyboard Mode key 120, and a Numeric Mode key 122. The function of these keys will be discussed in conjunction with FIG. 1B.

Figure 1B:
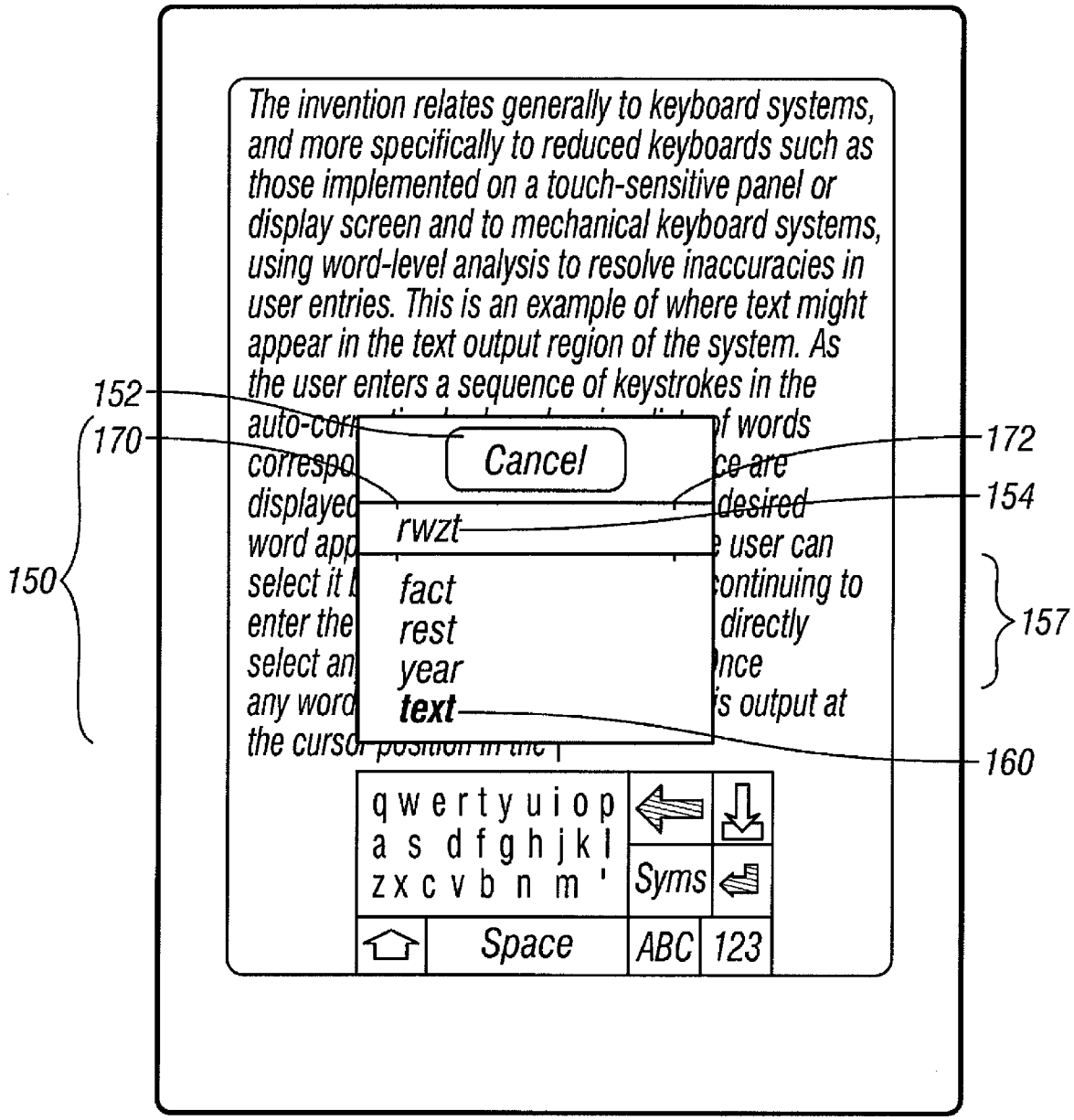
FIG. 1B is the same schematic view showing an embodiment of a word choice list that is displayed after the user has entered a sequence of keystrokes within the auto-correcting keyboard region.

Text is generated using the keyboard system via keystrokes on the auto-correcting keyboard 106. As a user enters a keystroke sequence using the keyboard, text is displayed on the computer display 103. Two overlapping regions are defined on the display each of which display information to the user. An upper output text region 104 displays the text entered by the user and serves as a buffer for text input and editing. A word choice list region 150, which in a preferred embodiment shown in FIG. 1B is super-imposed on top of the text region 104, provides a list of words and other interpretations corresponding to the keystroke sequence entered by a user. The word choice list region 150 aids the user in correcting inaccuracies in the entered keystrokes. In another embodiment, the system may be implemented on a device with limited display space, and display only the Default or most likely word object at the insertion point 107 in the text being generated.

In another preferred embodiment, the keyboard of the present invention is implemented using a keyboard device. Examples of such devices would include the standard desktop keyboard used with personal computers, or much smaller mechanical keyboards such as those commonly used in portable, hand-held electronic devices such as two-way pagers that, in the case of English and other Latin-alphabet based languages, include a full set of at least 26 small, closely spaced keys, often arranged in the standard "QWERTY" layout. This embodiment is logically identical to a touch screen implementation in which the points at which physical contact with the screen can be detected correspond exactly to the set of coordinates associated with the characters of the keyboard. Thus, the methods of the present invention may be applied equally well to such mechanical keyboard implementations.

However, mechanical keyboards have a distinguishing characteristic from touch screens in that a single inaccurate or erroneous key activation may not only consist of activating a key other than the one intended, but also may consist of simultaneous or closely sequential activation of two or more adjacent keys, wherein the activated keys may or may not include among them the intended key. Thus, in accordance with another aspect of the invention, a sequence of keystrokes on the auto-correcting keyboard is filtered through a window of both time and space, in that a single intended keystroke may activate more than one adjacent key. An example is when a user depresses 2, 3 or 4 keys when the user's finger is not properly aligned with the intended key or any single specific key. Thus, following each received keystroke, the keystroke is not processed until after the system waits for a very brief timeout threshold, or until a keystroke is received on a non-adjacent key. If the next keystroke occurs on an adjacent key, or if multiple keystrokes occur on adjacent keys, before the expiration of the timeout threshold, the detected keys are regarded as a single keystroke event. In such cases, a "virtual" point of contact is calculated at the center of the set of "simultaneously" activated keys. The distances from this calculated "virtual" contact point and the known character locations (key locations in this case of a mechanical keyboard) are calculated by interpolating to a logical coordinate frame with a finer resolution than that of the physical sensors (keys).

In another embodiment of the invention, keystrokes on the auto-correcting keyboard are not matched to characters in isolation, but rather entire sequences of keystrokes corresponding to completed words are matched against a lexicon of candidate words that includes information regarding the relative frequency with which each word appears in a representative corpus of usage. In this way, the system is often able to correctly compensate for occasional keystroke errors of a larger than average magnitude, or even multiple errors of a relatively larger magnitude when the intended word is of high relative frequency. This word-level analysis of keystroke input sequences are a key factor in enabling the inventive system to flexibly accommodate user keystroke errors.

The word-level analysis of keystroke sequences enables the system to generate punctuation characters such as a hyphen or apostrophe that are commonly embedded in words such as hyphenated compounds and contractions in English. Such embedded punctuation characters can be associated with one or more keys or character locations included in the auto-correcting keyboard among those associated with alphabetic characters. When more than one punctuation character is associated with a single key, the specific punctuation character intended can be disambiguated based on the information included in the lexicon. Thus, for example, if a word in the lexicon includes an apostrophe in a position corresponding to a key contact in the region of an ambiguous punctuation key, the matching algorithm will automatically identify the associated word and disambiguate the keystroke as an apostrophe. Simultaneously, the system can separately analyze the keystroke sequences preceding and following the key contact in the region of the punctuation key to determine the most likely matching words in the lexicon and calculate the likelihood that a hyphenated compound was intended. In the case of a keyboard implemented on a touch-sensitive display screen, other symbols, numbers or other characters not commonly used are relegated to a separate symbol selection scheme, preferably through presentation in a series of temporarily displayed tables. Such Symbol Tables are preferably accessed through a function key or touch entry element assigned adjacent to the auto-correcting keyboard region. In the case of a mechanical keyboard, these other symbols, numbers and uncommon characters are often accommodated through additional keys not included in the auto-correcting keyboard.

In accordance with another aspect of the invention, candidate words that match the input sequence are presented to the user in a word selection list on the display as each input is received. In accordance with another aspect of the invention, the word interpretations are presented in the order determined by the matching metric calculated for each candidate word, such that the words deemed to be most likely according to the matching metric appear first in the list. Selecting one of the proposed interpretations of the input sequence terminates an input sequence, so that the next keystroke inside the auto-correcting keyboard region starts a new input sequence. In accordance with yet another aspect of the invention, only a single word interpretation appears on the display, preferably at the insertion point for the text being generated. The word interpretation displayed is that deemed to be most likely according to the matching metric. By repeatedly activating a specially designated selection input, the user may replace the displayed word with alternate interpretations presented in the order determined by the matching metric. An input sequence is also terminated following one or more activations of the designated selection input (effectively selecting exactly one of the proposed interpretations of the sequence for actual output by the system), so that the next keystroke inside the auto-correcting keyboard region starts a new input sequence.

In accordance with another aspect of the invention, for each input sequence of contact points, a word is constructed by identifying the character nearest each contact point and composing a word consisting of the sequence of identified characters. This "Exact Type" word is then presented as a word choice in the word selection list. This word may then be selected in the usual manner by, for example, touching it in the word selection list. Exact Type entries can be edited by, for example, pressing a backspace key to delete one character at a time from the end of the word. Once the user selects the Exact Type word, it is automatically "accepted" for output and is added to the information being composed. When so selected, the Exact Type string may be added as a candidate for inclusion into the lexicon of words so that in the future it can be typed using the auto-correcting keyboard without needing to precisely contact each letter of the word as is necessary in first entering an Exact Type entry.

FIG. 1B shows a preferred embodiment of a word choice list 150 that is displayed after the user has entered a sequence of keystrokes within the auto-correcting keyboard region 106. The word choice list includes a Cancel key 152, wherein contacting the Cancel key causes the system to discard the current input sequence, clearing the word choice list and causing the system to restore the display of any text or graphics obscured by the appearance of the word choice list. The "Exact Type" word 154 shows the sequence of letters closest to the actual contact points of the input sequence, whether or not these correspond to any word in any vocabulary module. In the example shown in FIG. 1B, the Exact Type word "rwzt" does not correspond to an English word. In a preferred embodiment, selecting the Exact Type word for output results in the automatic addition of that word to the appropriate vocabulary module if it is not already included. The Default word 160 ("text" in the example of FIG. 1B) is the word from the vocabulary modules determined to have the lowest value of the matching metric (that is, the more likely the word corresponds to the user's intention), and in a preferred embodiment, is shown at the bottom of the word choice list, nearest to the auto-correcting keyboard region 106. Similarly, three alternate word choices 157 are shown in the list in an order determined by their corresponding matching metric values.

The Symbols Mode key 116, the Alternate Letter Mode key 120, and the Numeric Mode key 122 each cause a corresponding keyboard of punctuation and symbols, alphabetic letters, and numeric digits, respectively, to appear on the display screen. The user can then select the desired character or characters from the displayed keyboard. If a word choice list was displayed prior to displaying such an alternate keyboard, the selection of any character from the displayed alternate keyboard causes the Default word of the previously displayed word choice list to be output to the output text region 104 prior to outputting the selected character from the alternate keyboard. Similarly, if a word choice list was displayed prior to contacting the Space key 110 or the Return key 118, the Default word 160 is flushed to the output text region 104 prior to generating a single space or carriage return character, respectively.

In the preferred embodiment, the Shift key 108 functions as a latching Shift key, such that contacting it causes the letter associated with the next contact in the auto-correcting keyboard 106 to be generated as an upper-case letter. In another preferred embodiment, two successive contacts on the Shift key 108 puts the system in "Caps-Lock," and a subsequent activation cancels "Caps-Lock" mode. BackSpace key 112 deletes the last input contact from the current sequence of contacts if one exists, and otherwise deletes the character to the left of the cursor at the insertion point 107 in the output text region 104. When no current input sequence exists, a contact on the Edit Word key 114 causes the system to establish a current input sequence consisting of the coordinate locations associated with the letters of the word that contains the insertion point cursor 107 or is immediately to the left of this cursor in the output text region 104. The result is that this word is "pulled in" to the system creating a word choice list in which the word appears both as the Default word 160 and the Exact Type word 154.

Figure 2:
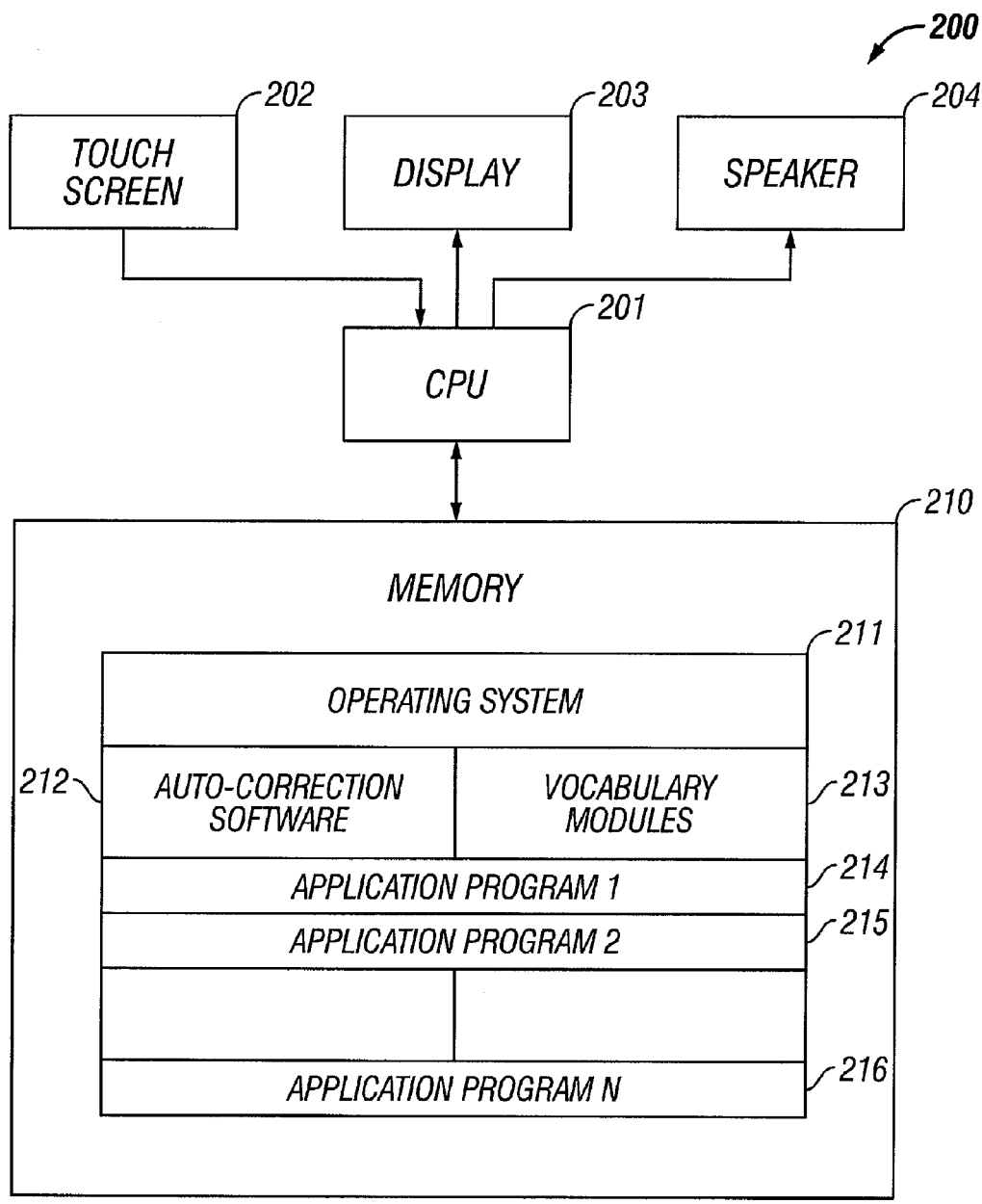
FIG. 2 is a hardware block diagram of the reduced keyboard system of FIGS. 1A and 1B.

A block diagram of the reduced keyboard disambiguating system hardware is provided in FIG. 2. The touch screen 202 and the display 203 are coupled to a processor 201 through appropriate interfacing circuitry. Optionally, a speaker 204 is also coupled to the processor. The processor 201 receives input from the touch screen, and manages all output to the display and speaker. Processor 201 is coupled to a memory 210. The memory includes a combination of temporary storage media, such as random access memory (RAM), and permanent storage media, such as read-only memory (ROM), floppy disks, hard disks, or CD-ROMs. Memory 210 contains all software routines to govern system operation. Preferably, the memory contains an operating system 211, auto-correction software 212, and associated vocabulary modules 213 that are discussed in additional detail below. Optionally, the memory may contain one or more application programs 214, 215, 216. Examples of application programs include word processors, software dictionaries, and foreign language translators. Speech synthesis software may also be provided as an application program, allowing the reduced auto-correcting keyboard system to function as a communication aid.

In accordance with another aspect of the invention, each input sequence is processed with reference to one or more vocabulary modules, each of which contains one or more words together with information about each word including the number of characters in the word and the relative frequency of occurrence of the word with respect to other words of the same length. Alternatively, information regarding the vocabulary module or modules of which a given word is a member is stored with each word. Each input sequence is processed by summing the distances calculated from each contact point in the entry sequence to the location assigned to the letter in the corresponding position of each candidate word, wherein the distances are calculated according to one of the preferred methods. This total distance is combined with the frequency information regarding each candidate word to calculate a matching metric by which the various candidate words are rank ordered for presentation to the user. In one preferred embodiment, the matching metric is calculated as follows. The square of the distance from each contact point in the entry sequence to the location assigned to the letter in the corresponding position of each candidate word is calculated, and the sum of the squared distances is calculated for each candidate word. This sum is then multiplied by a frequency adjustment factor, which in one preferred embodiment is calculated as the base 2 logarithm of the ordinal position of the word in the candidate list, where words of higher relative frequency are moved "higher" in the list to positions corresponding to a lower ordinal position (i.e., the most frequent word is at position "1"). Thus, the lower the numeric value of the calculated matching metric, the more likely a given word is deemed to correspond to the user's intention in generating a sequence of contact points.

In another aspect of the invention, prior to multiplying the sum of the distances (from each contact point in the entry sequence to each corresponding letter in a candidate word) by the frequency adjustment factor, a fixed increment is added to the sum so that it is at least greater than or equal to this increment value. This is done to avoid calculating a matching metric value of zero (i.e., the most likely match) when the sequence of contact points happens to correspond exactly to the spelling of a given word, even when that word occurs with very low frequency (i.e., has a high numeric ordinal position). This allows much more frequently occurring words to produce a better matching metric even when an inaccurate sequence of contact points is entered. In one implementation of this preferred embodiment, it was found that a fixed increment value of approximately twice the average distance between adjacent characters in the keyboard was effective in reducing spurious matches with infrequent words.

In accordance with another aspect of the invention, words in each vocabulary module are stored such that words are grouped into clusters or files consisting of words of the same length. Each input sequence is first processed by searching for the group of words of the same length as the number of inputs in the input sequence, and identifying those candidate words with the best matching metric scores. In accordance with another aspect of the invention, if fewer than a threshold number of candidate words are identified which have the same length as the input sequence, and which have a matching metric score better than a threshold value, then the system proceeds to compare the input sequence of N inputs to the first N letters of each word in the group of words of length N+1. This process continues, searching groups of progressively longer words and comparing the input sequence of N inputs to the first N letters of each word in each group until the threshold number of candidate words are identified. Viable candidate words of a length longer than the input sequence may thus be offered to the user as possible interpretations of the input sequence, providing a form of word completion. In another aspect of the invention, prior to multiplying the sum of the distances (from each contact point in the entry sequence to each corresponding initial letter in a candidate word whose length is greater than the length of the current input sequence) by the frequency adjustment factor, a second fixed increment is added to the sum so that it is greater than the distance sum that would be calculated for a word whose length corresponds exactly to the length of the current input sequence. This is done to assign a relatively higher matching probability to words whose length does correspond exactly. In another preferred embodiment, this second increment factor is a function of the difference in length between the candidate word and the current input sequence.

Figure 3:
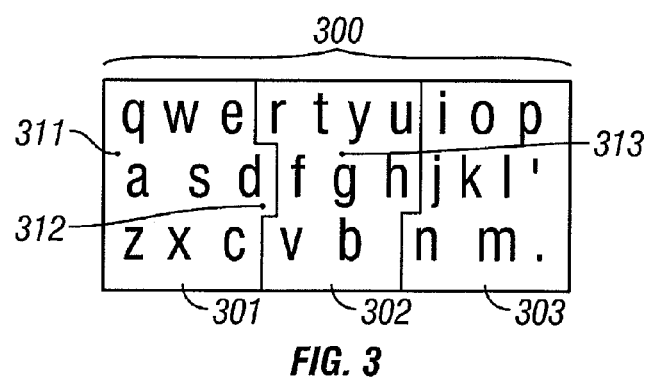
FIG. 3 is a schematic view of a preferred embodiment of an auto-correcting keyboard region of the reduced keyboard system of the present invention which automatically corrects input keystrokes, showing its division into three clustering regions and three example contact points.

In accordance with another aspect of the invention, in order to increase the efficiency with which the vocabulary modules can be processed, each character mapped onto the touch-sensitive pad in the auto-correcting keyboard region is assigned a boundary of exclusion. Each such boundary identifies the region beyond which the distance from the contact point to the character will not be calculated and the character will be removed from consideration for that contact point in the input sequence, reducing the computation required by the distance calculation process. The boundaries of exclusion for several characters may share some or all common boundary segments. Examples of shared boundaries include the extreme edge of the auto-correcting keyboard region, or gross boundaries drawn through the character space to subdivide the auto-correcting keyboard into 2, 3 or more major clustering regions. Conceptually, it is identical to consider the boundary of exclusion for a given contact point, where any character outside that boundary is excluded from consideration as a match for that input point. For example, FIG. 3 shows an auto-correcting keyboard region 300 that consists of a horizontal rectangle which is divided vertically into three clustering regions 301, 302, 303 of approximately equal size, where these regions are defined such that each character falls into only one of the three clustering regions. The clustering regions are defined such that for each contact point in the auto-correcting keyboard region, at least one and frequently two of the three regions lie completely outside the boundary of exclusion for that contact point. For example, a contact point 311 at the left side of region 301 is far enough away from region 302 that all characters in region 302 (and region 303) could be defined to lie outside the boundary of exclusion for contact point 311. In contrast, the boundary of exclusion for contact point 312 at the right side of region 301 would extend into region 302 such that one or more characters in region 302 would be considered to lie inside the boundary, so that the only region completely outside the boundary of exclusion for contact point 312 would be region 303. The boundary of exclusion for contact point 313 in the center of region 302 could be considered to be far enough away from both region 301 and region 303 that all characters in both these regions could be defined to lie outside the boundary.

Such clustering regions are then used to increase the efficiency with which the system can identify the most likely matching words in one or more vocabulary modules for a given input sequence of contact points. Continuing the example described above and depicted in FIG. 3, the words of a given length in each vocabulary module can be divided up into nine different sub-groups based on the clustering regions in which each of the first two letters of each word is found, since there are nine possible ordered pairs of such regions. Note that processing words of only one letter need not be optimized since very little calculation is required and there are only a very small number of one-letter words, even when every letter is treated as if it is a one-letter "word." For each of the first two contact points, letters in one or two of the clustering regions can be eliminated from consideration, so that all of the words in the sub-groups associated with letters in the eliminated regions can be skipped over without needing to perform any distance calculations. Thus, assuming a more or less equal distribution of total character frequency among the three regions for the first two character positions of words in the vocabulary modules, upon the receipt of the second contact point, the system need only calculate distances for and compare at most 4/9 of the candidate words (when only one clustering region is eliminated from consideration for each contact point) to as few as 1/9 of the candidate words (when two clustering regions are eliminated for each contact point). As would be obvious to one of ordinary skill in the art, this method can be used with a greater or lesser number of clustering regions, and for different numbers of initial contact points, with corresponding results. For example, four clustering regions could be used to divide candidate words into sixteen sub-groups based on the first two contact points.

In another embodiment of the invention, a subset of characters or functions will be associated with uniquely defined regions or keys outside the auto-correcting keyboard, where entries within these regions are interpreted as explicit entries of a specific character or function, for example, a Space key that unambiguously generates a single space when selected. For a defined set of such keys, selecting such a key immediately following an input sequence, and prior to performing an explicit selection of any of the interpretations offered by the system for the input sequence, results in the automatic acceptance of the interpretation of the input sequence deemed to be most likely according to the matching metric calculated for each candidate word. The input sequence is terminated, so that the next keystroke inside the auto-correcting keyboard region starts a new input sequence. Once the desired word interpretation of an input sequence has been determined and the sequence is terminated, the system automatically outputs the word so that it is added to the information being constructed. In the case of certain functions, for example the backspace function, an entry within the associated region is interpreted as an explicit entry of the backspace function, which is immediately executed. The result in this case however, does not terminate the input sequence, but simply deletes the last (most recent) input from the sequence. In general, keys outside the auto-correcting keyboard are immediately interpreted and acted upon according to the unique character or function associated with the key. Depending on the associated character or function, in some cases the current input sequence is terminated as a result.

In accordance with another aspect of the invention, the system distinguishes between two different types of contact events that occur in the area of the touch screen or touch-sensitive display that is used to display the auto-correcting keyboard region and other uniquely defined regions or keys outside the auto-correcting keyboard. One type of contact consists of a "tap" event, wherein the touch screen is contacted and then the contact is terminated without moving beyond a limited distance from the initial point of contact. This type of event is processed as a keystroke intended for the reduced auto-correcting keyboard system as described in this disclosure. The second type of contact consists of a "stroke" event, wherein the touch screen is contacted then the point of contact is moved in one or more directions beyond the limited distance threshold used to define a tap event. This second type of contact can then be processed by using a stroke recognition system using techniques that are well known in the art. This allows a number of additional functions or special characters to be made easily accessible to the user without having to trigger pull-down menus or define additional keys that would either require additional screen space or reduce the size of the keys provided. The interpretation of such strokes and the resulting character or function associated with a recognized stroke is then processed by the system in the same fashion as an activation of one of the uniquely defined regions or keys outside the auto-correcting keyboard. In this way, only a limited area of the available touch screen or touch-sensitive display needs to be used to accommodate both keyboard-based and stroke recognition input approaches.

In accordance with another aspect of the invention, the system performs additional processing of "tap" events to dynamically adjust to a particular user's style of contacting the touch screen or touch-sensitive display. For a user who contacts the display with a stylus "gesture" that closely approximates a point (i.e., the stylus contacts the display and is lifted before being moved any appreciable distance), there is no significant ambiguity as to where the user intended to contact the keyboard. However, when the stylus moves to a greater or lesser extent before being lifted from the display, there is ambiguity as to which point contacted during the duration of the stylus "gesture" best represents the point that the user intended to contact—the initial point of contact, the final point where the stylus was lifted, or some other point along the path of contact of the stylus. In a preferred embodiment, the system records the path traced out by each contact as a set of N contact points that include the endpoints of the path of contact and zero or more points equally spaced points along the path. For example, in an embodiment where N is set to 3, the set would include the endpoints and the midpoint of the path. Initially, one point of each set of recorded points is designated as the coordinate to be used to represent the point of contact in calculating distances to letters in the auto-correcting keyboard. For example, in a preferred embodiment, the initial point of contact recorded in each set is designated as the coordinate to be used to represent the point of contact in all distance calculations. Each time a word is selected for output from the word choice list, the distance calculation is repeated from each letter in the chosen word to each of the other sets of recorded points. For example, when N is set to 3 and the calculation is performed for the starting point of contact, the calculation is repeated for the set of midpoints and for the set of endpoints. Whichever set of points results in the minimum calculated distance is then designated as the set of points whose coordinates are to be used to represent the sequence points of contact in all subsequent distance calculations in creating the word choice list for each sequence of contacts. In another preferred embodiment, a running average is computed of the distance calculations performed for each point set, and the point set for which this running average is lowest is used for distance calculations in creating the word choice list. In another preferred embodiment, the running average is computed of the horizontal and vertical signed offset of the designated points from the intended target letters, and the coordinates used in distance calculations for creating the word choice list are adjusted by this average signed offset, or by a fixed fraction of this offset. Thus, if a user consistently contacts the touchscreen somewhat to the left and below the intended letters, the system can automatically adjust and more accurately predict the intended word on average.

In accordance with another aspect of the invention, each character mapped onto the touch-sensitive pad in the auto-correcting keyboard region is assigned a region of territory. Each such region identifies an area wherein the distance from the user entry to the character is assigned the value of zero, simplifying the distance calculation process. The size of such regions can vary for different characters and functions. For example, a larger region may be assigned to a character that occurs with a relatively higher frequency within a representative corpus of usage. In one embodiment, this region assigned to a character simply corresponds to a defined key that is clearly circumscribed and demarcated on the touch screen, and to which the character is assigned.

The operation of the reduced auto-correcting keyboard system is governed by the auto-correction software 212 which is based in part on the distance between the contact point and the various candidate characters. In one embodiment of the invention, each character in the auto-correcting keyboard is assigned a Cartesian coordinate to simplify the calculation of the distance to keystrokes. The distance between the contacted point and the various candidate character locations in the auto-correcting keyboard, therefore, is calculated through simple Cartesian coordinate distance analysis. In another embodiment of the invention, the square of the simple Cartesian coordinate distance is used to both simplify calculation (because no square root need be calculated) and to apply a non-linear weighting to more distant contact points. In other embodiments, the distance calculation also utilizes other nonlinear functions such as natural logarithms or discrete steps, either exclusively or in an appropriately weighted combination with Cartesian coordinate distance analysis.

Also, in another preferred embodiment the distances in the x and y directions are weighted differently. Such modifications to the distance calculation can serve to simplify word selection, reduce processing requirements, or to accommodate systematic entry anomalies depending on the particular needs of a given system and its implementation. For example, in the case of a touch screen display panel on which a QWERTY keyboard arrangement is displayed with three rows of character keys, it is generally less likely that a significant error will be made in contacting the keyboard in the wrong row. In this case, vertical distance along the y-axis may be weighted more heavily than horizontal distance along the x-axis.

Additionally, the spacing between characters on the auto-correcting keyboard may be non-uniform, depending on how frequently any given character is used in a representative corpus of the language, or on its location relative to the center or the edge of the keyboard. Alternatively, when sufficient computational resources are available, one or more characters may be assigned a plurality of corresponding coordinate locations to be used as reference points in calculating the distance of the key from the coordinate location of a point at which the keyboard was contacted, wherein that distance is calculated as the distance from the contacted point to the closest such assigned reference coordinate. This will tend to decrease the calculated distances to points at which the display is contacted in a non-linear fashion, and consequently increase the size of the region surrounding the character in which there is a high likelihood that a sequence of contacts that includes a contact point in the region will match a word with the character in the corresponding position.

Also, the coordinates of the characters may be assigned to locations not shared by keyboard keys or directly detectable by sensors. This allows the system to be implemented using less costly touch screens or keyboards having a lower resolution in detecting points of contact. It also allows the keyboard to be reconfigured according to the user's wishes but still utilizing the same physical keyboard touch screen or sensor array. For example, the common three rows of characters in the QWERTY layout may be served with 1, 2, 3 or more rows of sensors to reduce the keyboard's mechanical complexity or to allow dynamic reassignment of novel keyboard arrays. An example would be changing from 3 rows of 9 characters to 4 rows of 7 characters. The assigned coordinate location for a given character key may thus lie between the nearest two or more points at which physical contacts with the keyboard may be detected and resolved. In this case, the distance from a detectable contact point and the assigned character location is calculated by interpolating to a logical coordinate frame with a finer resolution than that of the physical sensors.

In one preferred embodiment of the system, additional processing optimization is achieved by setting a limit on how many letters in a given candidate word can be further away from the corresponding input contact point than a preset threshold distance (maximum_key_distance). If this preset threshold maximum_key_distance is set to a value other than MAX_DISTANCE_VALUE (the maximum distance value that can be calculated by the distance measurement algorithm used in the system), then a second threshold over_max_distance_limit is set to the maximum number of letters in a given candidate word that can be further than maximum_key_distance from the corresponding input contact point.

Figure 4A:
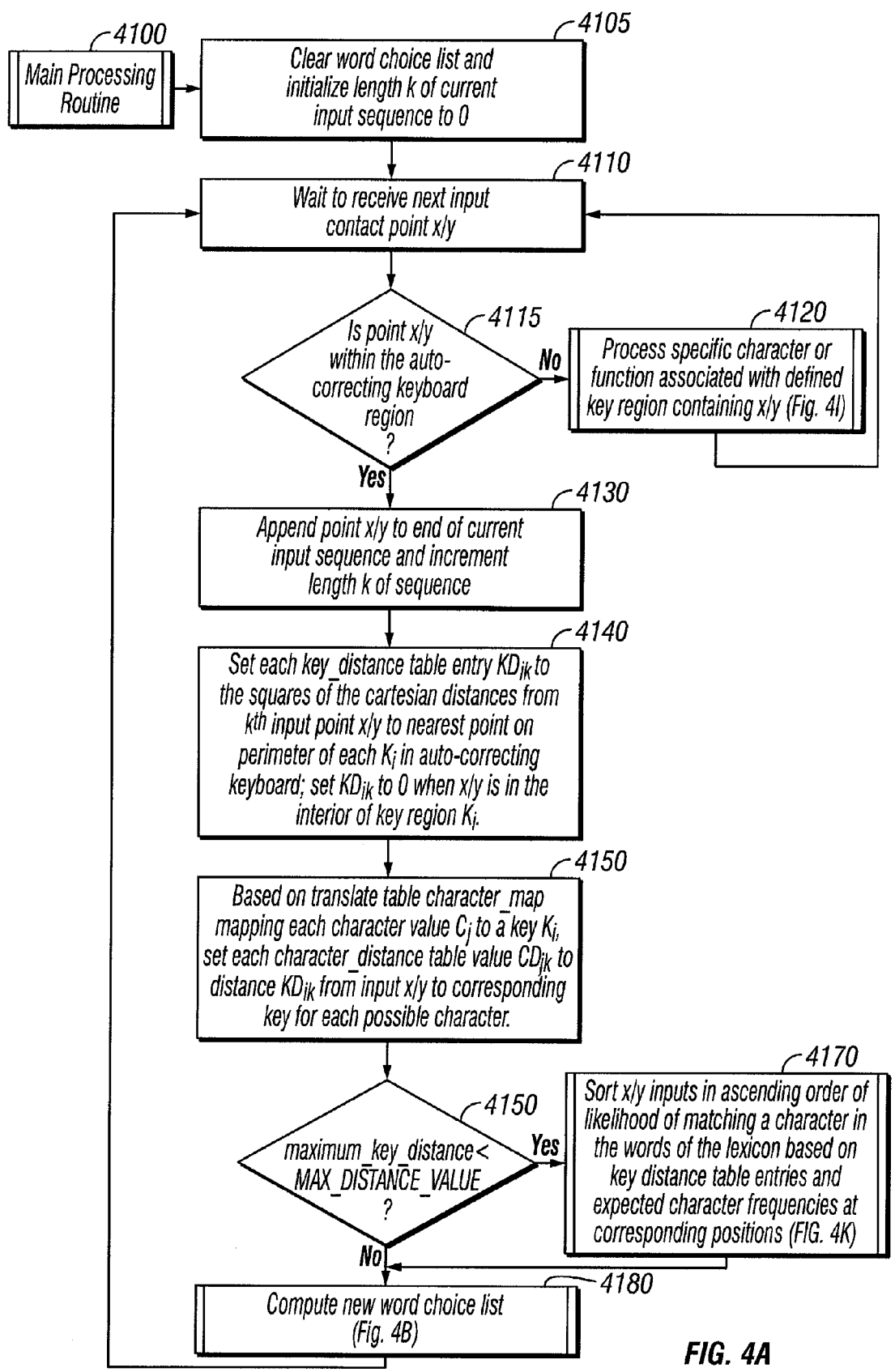
FIGS. 4A through 4K show a flow chart of a preferred embodiment of software to determine the intended text to be generated in response to an input sequence of keystrokes.
Figure 4B:
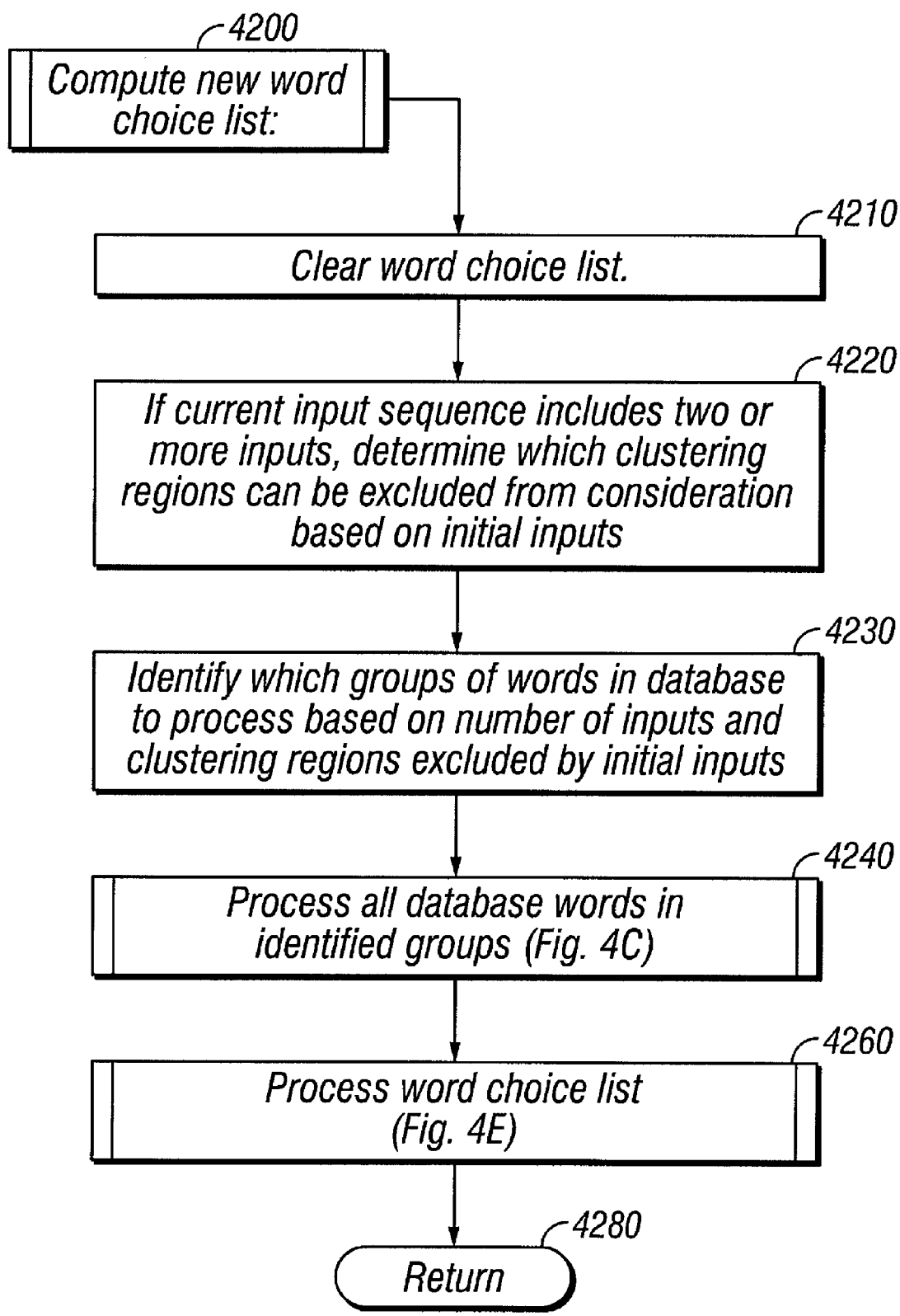
Figures 1, 4C:
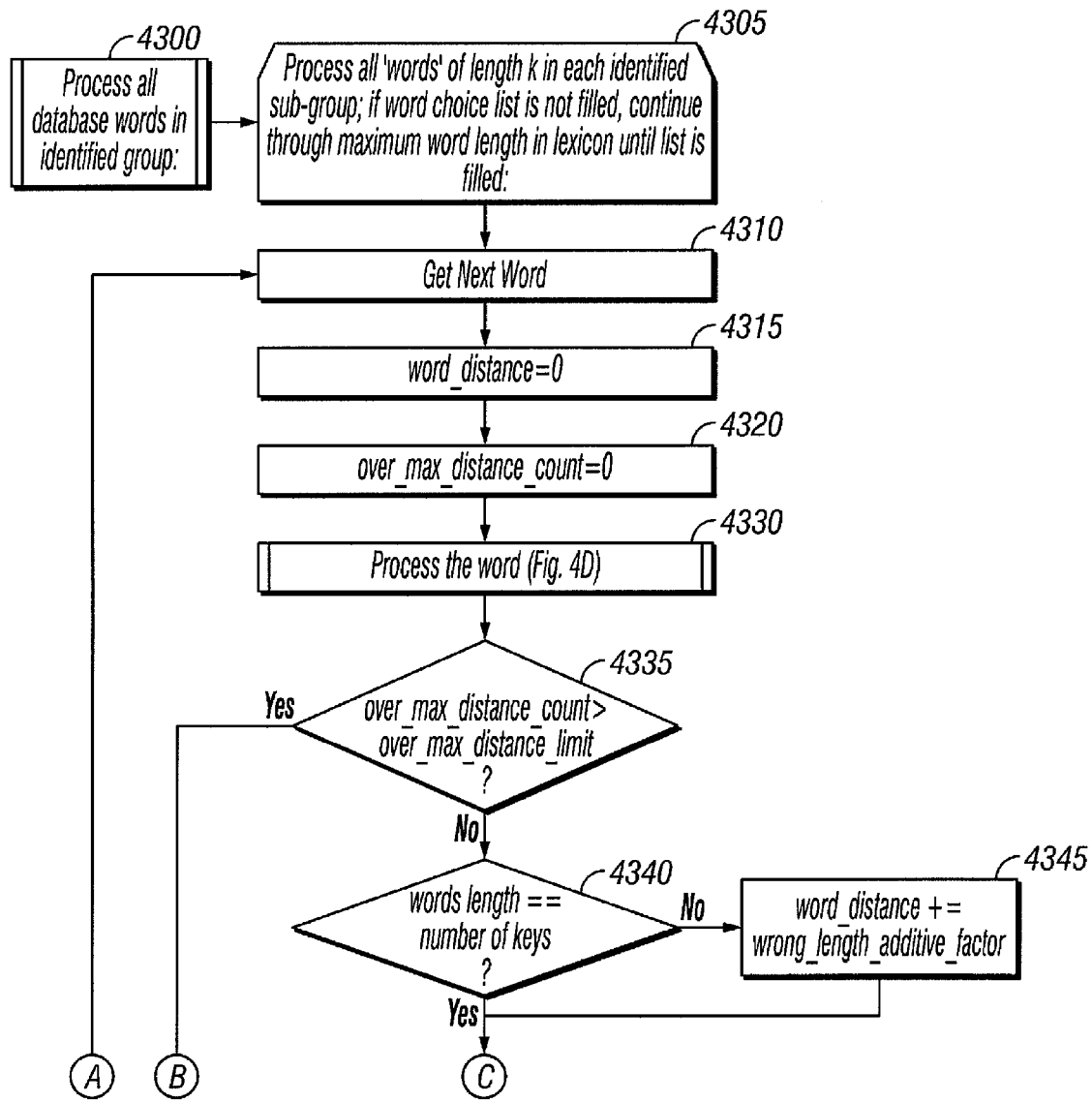
Figures 2, 4C:
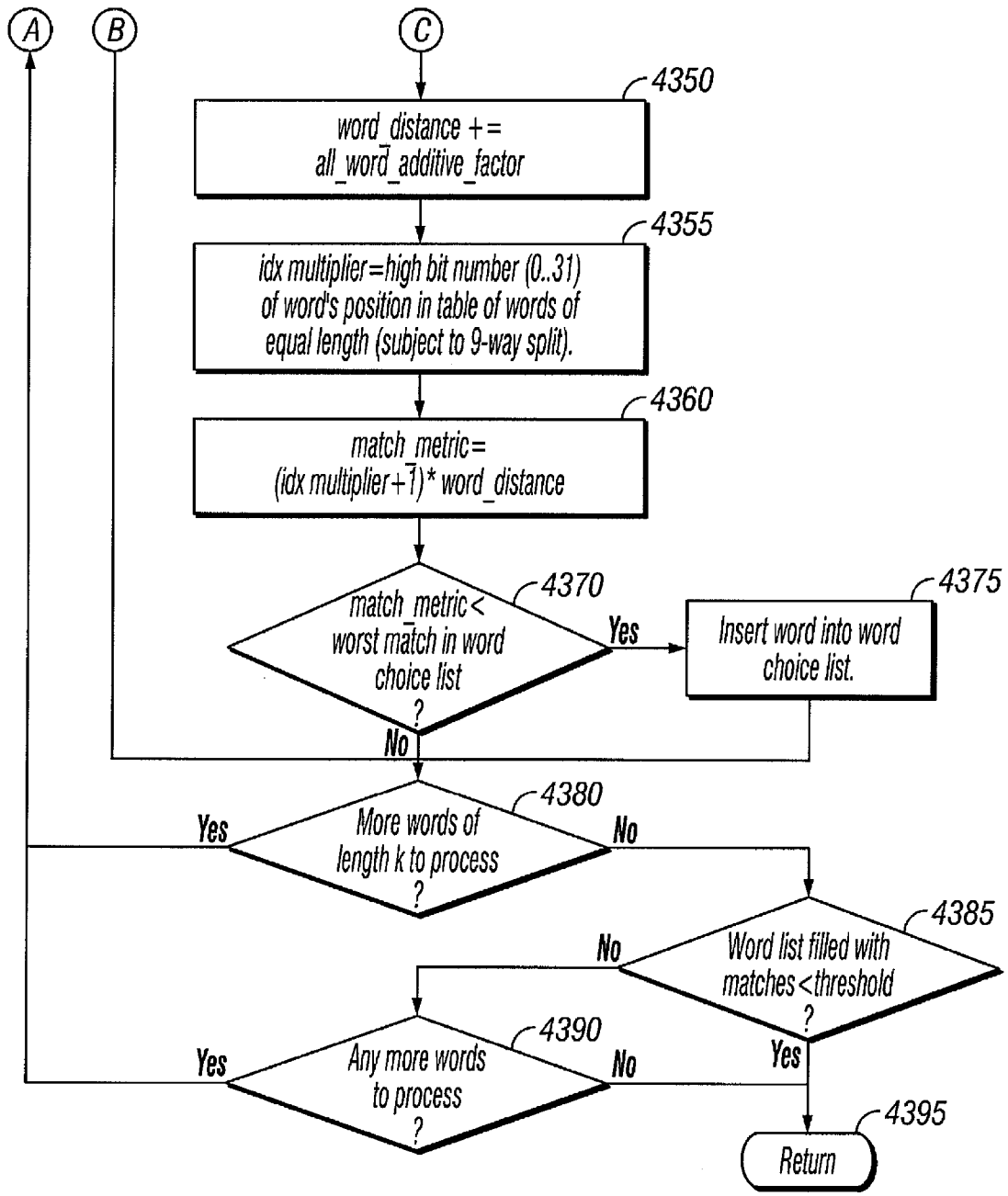
Figure 4D:
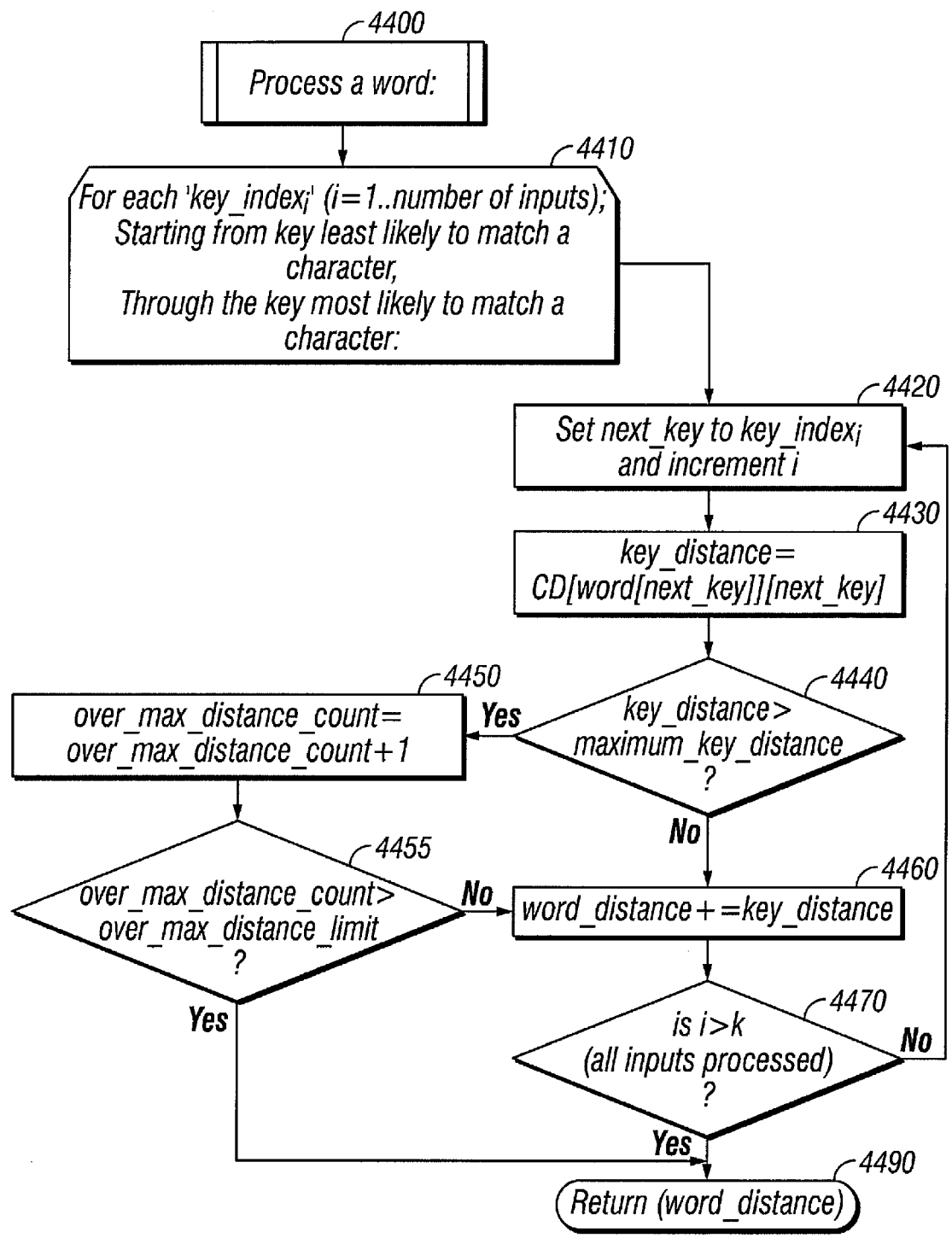
Figure 4E:
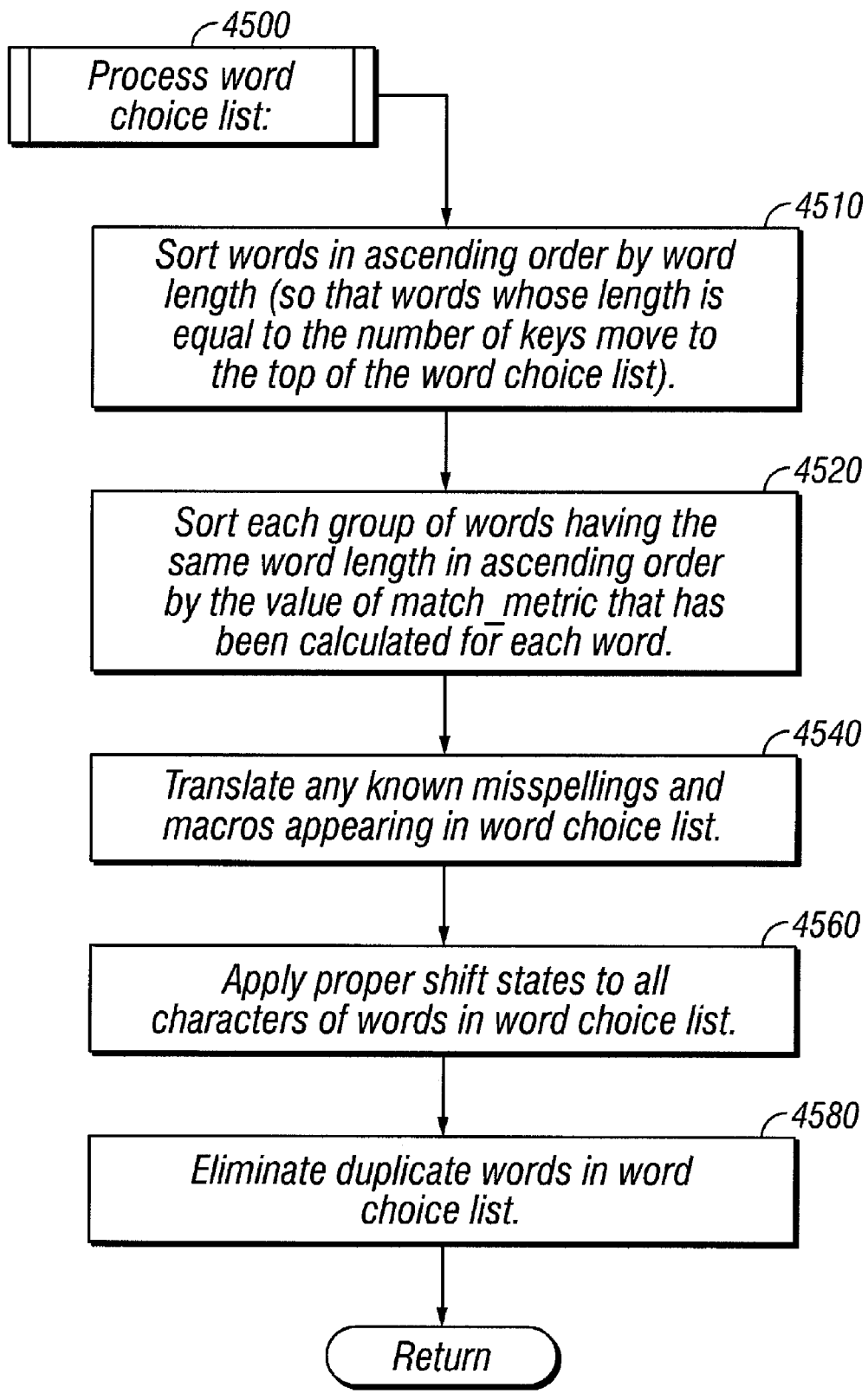
Figure 4F:
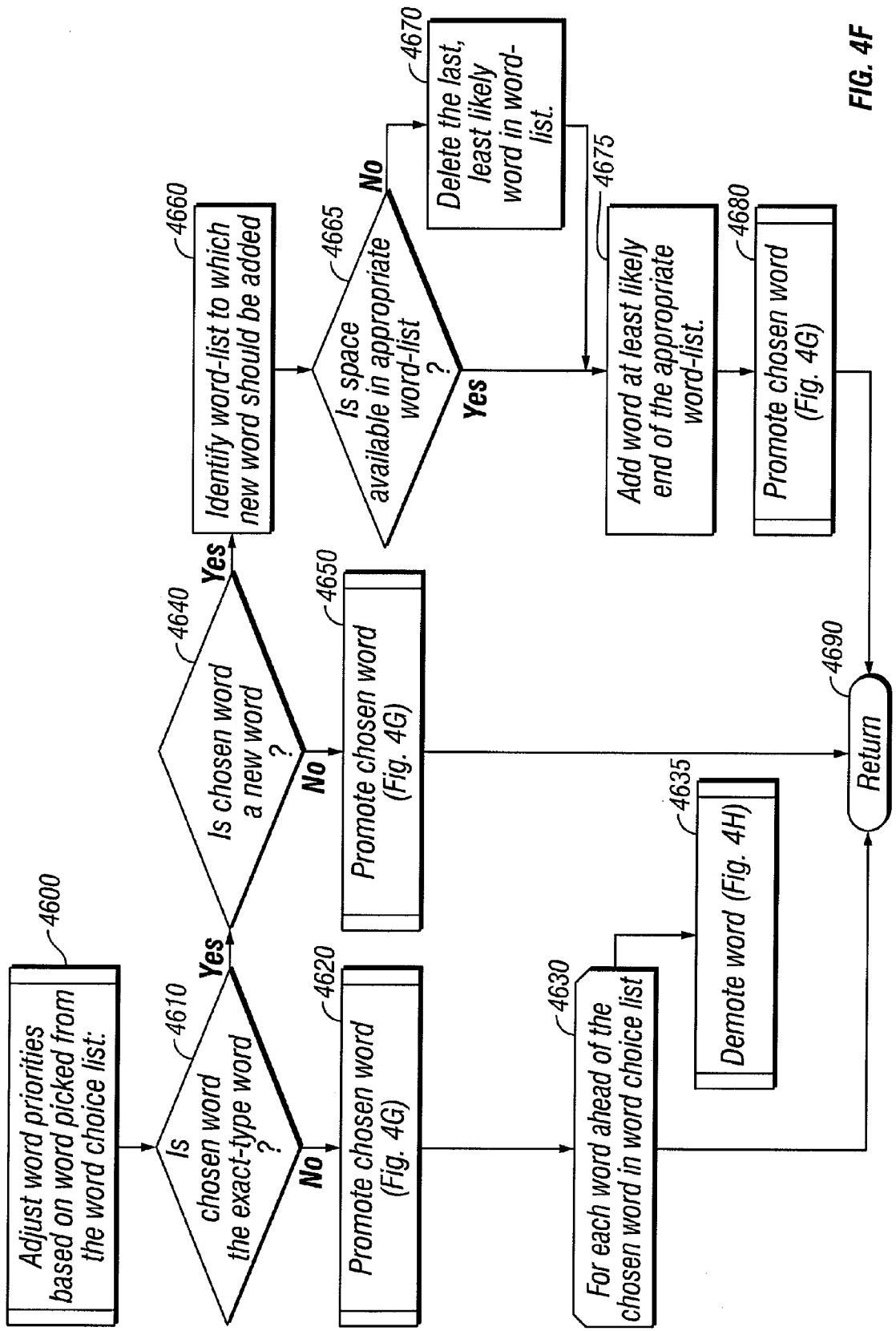
Figure 4G:
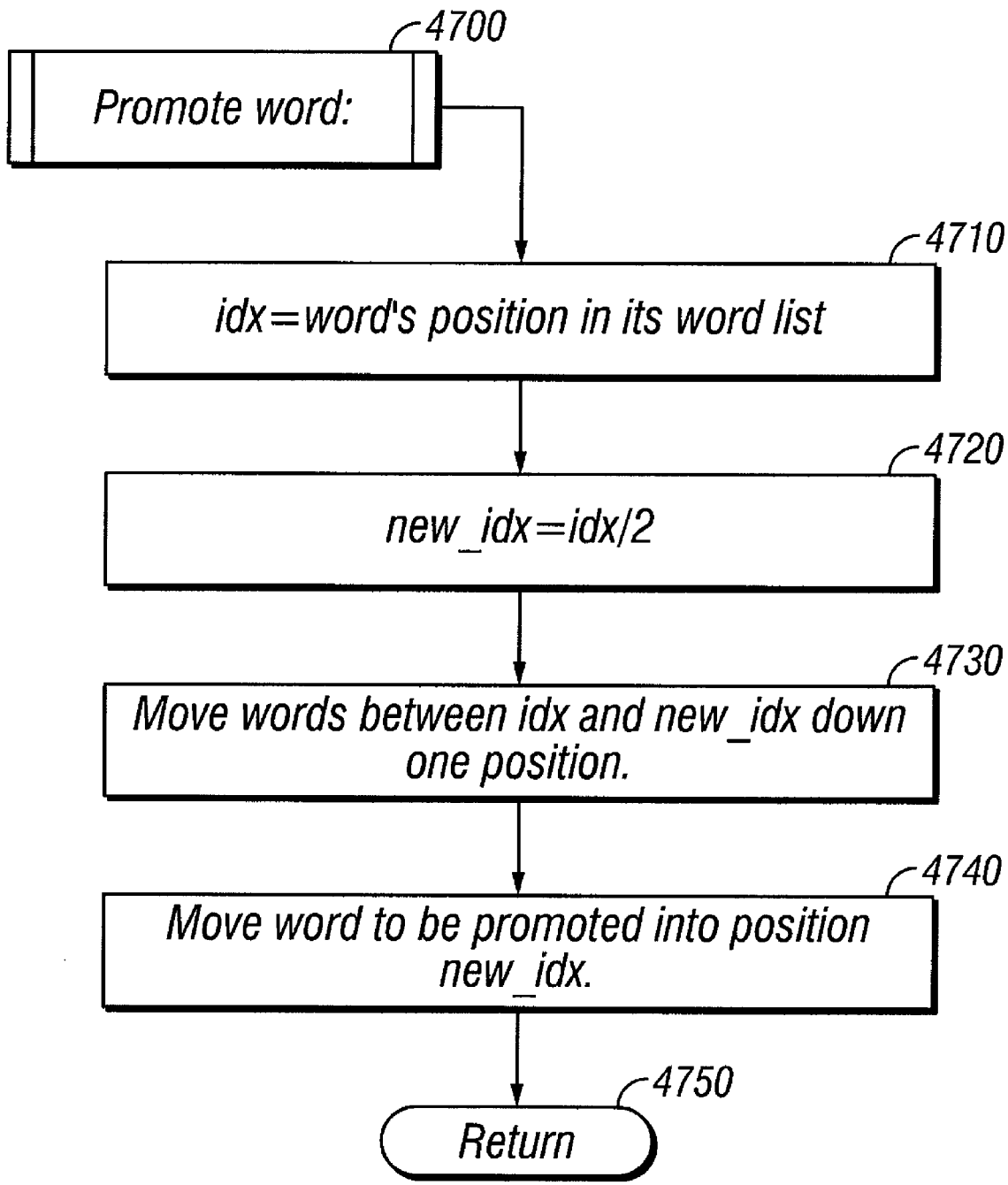
Figure 4H:
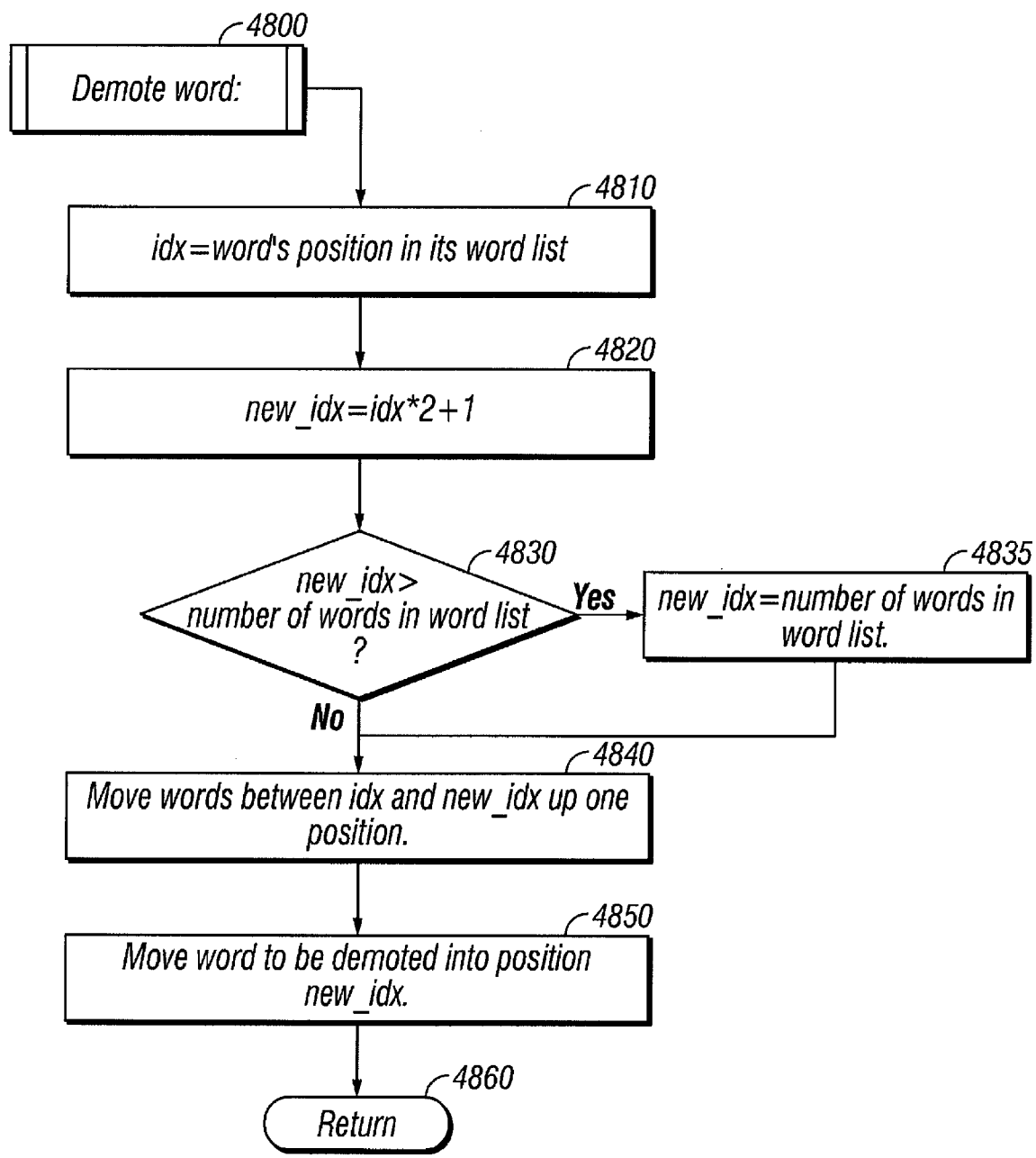
Figure 4I:
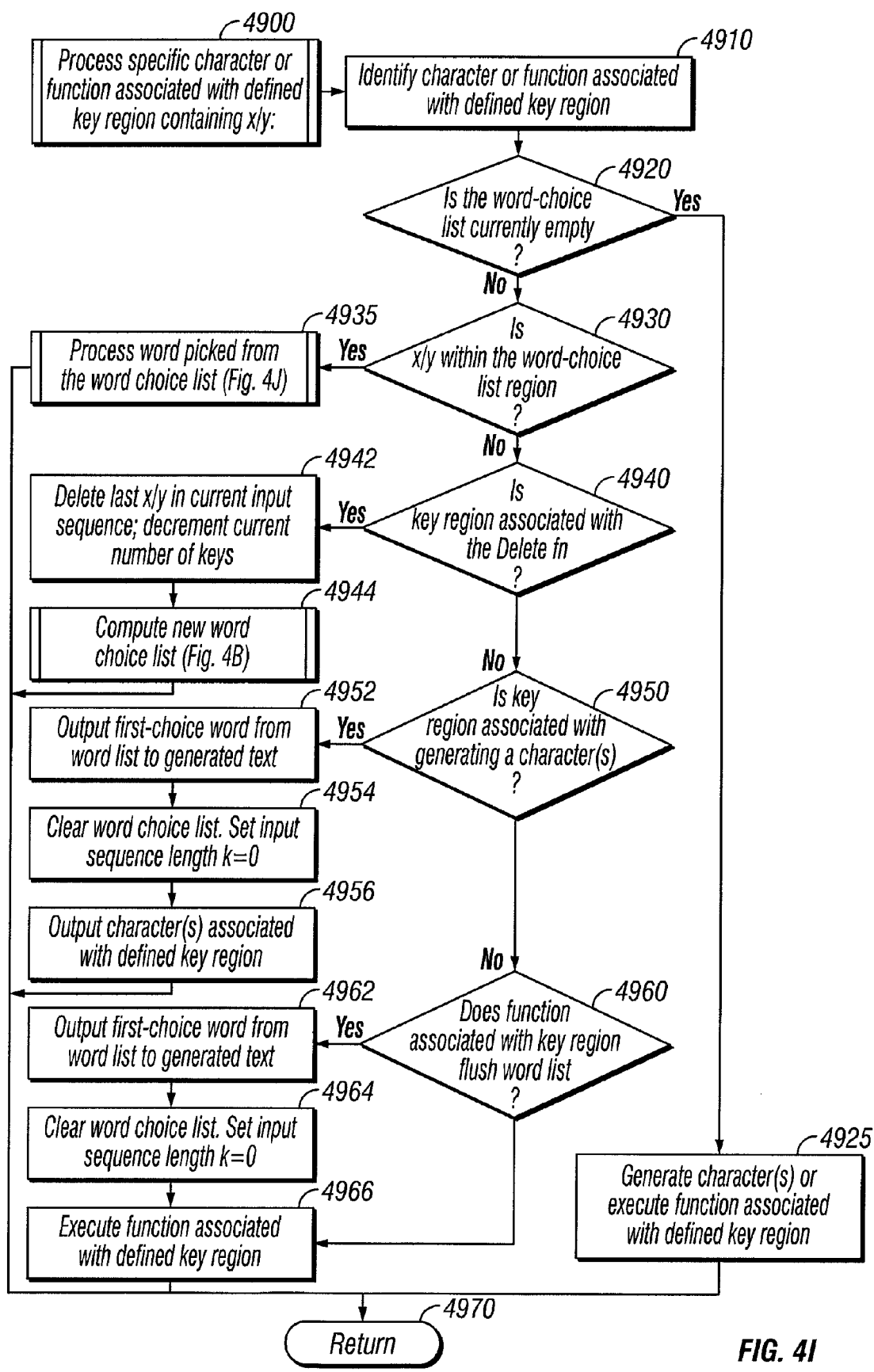

FIGS. 4A through 4K show a flow chart of a preferred embodiment of a main routine of the auto-correction software 212 that generates and manages a word choice list to aid the user in efficiently utilizing inaccurate keystroke sequences. FIG. 4A, shows the main processing routine, which when the system is first started, at block 4105 initializes both the word choice list and the current input sequence to an empty state. Then, at block 4110, the system waits to receive a keystroke from the touch screen 202. Upon receipt of a keystroke, at block 4115 the system determines whether the coordinates x/y of the received keystroke contact point lie within the boundaries of the auto-correcting keyboard region 106. If not, then the process indicated in block 4120 is carried out as shown in the flowchart of FIG. 4I, wherein the system processes the specific character or function associated with the defined key region containing contact point x/y. If at block 4115 the received keystroke contact point x/y lies within the boundaries of the auto-correcting keyboard region 106, then at block 4130 the length k of the sequence is incremented by one, and the point x/y is appended to the end of the current input sequence as the $k^{th}$ input. Then at block 4140, the system sets the key_distance table entries $KD_{ik}$ to the squares of the Cartesian distances from the $k^{th}$ input point x/y to the nearest point on the perimeter of each key $K_i$ in auto-correcting keyboard, setting $KD_{ik}$ to 0 when x/y is in the interior of key region $K_i$. At block 4150, for each possible character $C_j$ that is a valid character appearing in one or more words of the vocabulary modules 213, a translate table character_map mapping each character value $C_j$ to its corresponding key $K_i$ is used to set each element $CD_{jk}$ of the $k^{th}$ row of the character_distance table to the squared distance $KD_{ik}$ from $k^{th}$ input x/y to the key $K_i$ corresponding to each possible character $C_j$. This allows the distances used in calculating the matching metric to be calculated only once (when $KD_{ik}$ is set in the key_distance table), and the translate table character_map is likewise used only once when the character_distance table is filled in from the key_distance table. This allows for greater efficiency in the large number of calculations that would otherwise be repeated in processing the words of the vocabulary modules.

At decision block 4160, the variable maximum_key_distance is checked to determine whether it is set to a value other than MAX_DISTANCE_VALUE, and if so, at block 4170, an auxiliary index array is sorted so that, in searching the words of the vocabulary modules, the x/y inputs can be processed in ascending order of the likelihood of matching a character mapped to a key close to the x/y input. Sorting the inputs x/y to be processed in this order tends to minimize the total amount of computation required to process the vocabulary modules for the input sequence, since this increases the likelihood across all words that one or more x/y inputs will be greater than maximum_key_distance from the corresponding key before all inputs have been processed, so that the remaining inputs need not be processed since the word will be disqualified as a candidate as soon as the number of such inputs exceeds over_max_distance_limit. FIG. 4K shows a preferred embodiment of how the likelihood of matching a character mapped to a key close to a given x/y input is calculated. A table character_frequencies is included with the vocabulary modules wherein element character_frequencies$_{ij}$ contains the sum of the relative frequencies of all characters found as the j$^{th}$ character of any word in the vocabulary, and which are mapped in character_map to key $K_i$. At block 41110, match_probability$_k$ for the current input x/y is initialized to zero. In loop 41120, at decision block 41130, if key $K_i$ is no greater than maximum_key_distance from the input x/y, then at block 41140 then match_probability$_k$ is incremented by the value of character_frequencies$_{ij}$ divided by the distance ($KD_{ik}$+1), where the distance $KD_{ik}$ is incremented by 1 to avoid division by zero and to scale each character_frequencies$_{ij}$ appropriately. When all keys have been processed in loop 41120, then at block 41150, the index values 1.k in array key_index are sorted in ascending order according to the values of match_probability$_k$ that have been calculated for each input.

Returning to FIG. 4A, at block 4180, a new word choice list is computed based on the current input sequence of length k. FIG. 4B shows a preferred embodiment for computing a new word choice list. At block 4210, any previously computed word choice list is cleared. At block 4220, if current input sequence includes two or more inputs, the software determines which of the three clustering regions can be excluded from consideration based on the coordinate locations of the first two inputs of the sequence. At block 4230, based on the excluded clustering regions, of the nine possible sub-groups of each word list in the vocabulary modules, the sub-groups of words which actually need to be processed are identified. Then, in block 4240, only these identified sub-groups are processed in order to identify candidate words to show in the word choice list.

FIG. 4C shows how the words in the identified sub-groups are processed to build a word choice list of the words that are most likely to match the user's intention in entering an input sequence of keystrokes consisting of contact points inside the auto-correcting keyboard region. Block 4305 defines the limits of the loop from block 4310 through the test at block 4380 for loop termination. Block 4380 tests whether there are any more words of length k, the current length of the input sequence, that belong to one of the identified sub-groups, that have not yet been processed. If not, then at block 4385 the system tests whether the word list has been filled, and whether the value of the matching metric calculated for each word in the list is less than a predetermined threshold. If so, then the word list is deemed to have been filled with potential matches of an appropriate quality, and at block 4395 the processor returns to block 4260 in FIG. 4B. If not, then at block 4390, the system tests whether there are any more words of any length greater than k, that belong to one of the identified sub-groups, that have not yet been processed. If not, then at block 4395 the processor returns to block 4260.

Once the next word to be processed has been obtained from a vocabulary module at block 4310, at block 4315 word_distance is set to zero so that the weighted distance from the input sequence to this word can be summed into this variable. Then at block 4320, over_max_distance_count is set to zero so that the number of letters in the word that are further from the corresponding contact point in the input sequence than a preset maximum threshold maximum_key_distance to this word can be counted with this variable. Then at block 4330, the word is processed as shown in FIG. 4D. Block 4410 initializes the loop counter i to 1 and defines the limits of the loop from block 4420 through the test at block 4490 for loop termination when each of the k inputs in the current sequence have been processed. At block 4420, the variable next_key is set to the next index array value key_index$_i$, which was sorted according to FIG. 4J so that inputs are processed starting with those for which the calculated key_distance is most likely to exceed the threshold maximum_key_distance. The loop counter i is then incremented. At block 4430, key_distance is set to the corresponding value already calculated and stored as described above in the array CD, which contains the distance from each contact point in the input sequence to each possible character that occurs in any word of the vocabulary modules. At decision block 4440, if key_distance exceeds the threshold maximum_key_distance, then at block 4450 over_max_distance_count is incremented and at decision block 4455 over_max_distance_count is tested to determine if the maximum number over_max_distance_limit of such inputs has been exceeded. If so, loop 4410 is terminated early and the incorrect word distance, which is then returned at block 4490, is of no consequence since this word is disqualified from further consideration. If at decision block 4440, key_distance does not exceed the threshold maximum_key_distance, or if at decision block 4455, over_max_distance_count does not exceed the threshold over_max_distance_limit, then at block 4460 key_distance is summed into the total word_distance being calculated for the current word. This process is repeated for each contact point in the input sequence until at decision block 4470 it is determined that all inputs have been processed. When this process returns from block 4490, either word_distance has been correctly calculated for the current word, or over_max_distance_count exceeds the threshold over_max_distance_limit, and the current word is disqualified from further consideration.

Returning to FIG. 4C at decision block 4335, over_max_distance_count is tested to determine whether the current word is disqualified, and if so, execution proceeds to block 4380 to test whether the word processing loop 4305 should terminate. If not, at decision block 4340, if the length of the current word is greater than the number of inputs, then at block 4345 the calculated word_distance is incremented by a fixed amount wrong_length_additive_factor. In another preferred embodiment, wrong_length_additive_factor is calculated as a function of the difference between the number of letters in the word and the number of contact points in the input sequence. In either case, processing returns to block 4350 where word_distance is incremented by a fixed amount all_word_additive_factor, to prevent any word from having a word_distance value of zero, so that the match_metric calculated for the word reflects its relative priority in the vocabulary module's list. At block 4355, a multiplicative factor idx_multiplier is calculated to use as a weighting factor in combination with the calculated word_distance to determine the value of match_metric for the word. In the preferred embodiment shown in FIG. 4C, idx_multiplier is calculated as the bit position of the highest bit set to 1 in a binary representation of the numeric index of the word's ordinal position in the list of which it is a member. This value ranges from 0 to 31, where 0 corresponds to the highest bit position, and 31 the lowest. In block 4360, this value is incremented by 1 so the multiplicative factor used is greater than or equal to 1 so that any non-zero word_distance will result in a non-zero match_metric value.

If at decision block 4370 the match_metric is less than the worst (i.e. highest) match_metric score within the word choice list then the current word is inserted into the word choice list. If the match_metric is greater than or equal to the worst match_metric score within a full word choice list, than the current word is ignored. Decision block 4380 returns to block 4310 if there are any words left that have not been processed that are the same length k as the current input sequence. When decision block 4380 finds no more words to of length k to process, decision block 4385 tests whether the word choice list contains a full complement of matching words (in one preferred embodiment, a full complement consists of four words), each of which has a match_metric value below a predetermined threshold. If at decision block 4385 it is found that that the word list does not yet contain a full complement of matching words, then at block 4390 the system determines whether there are any words left of length greater than the current input sequence length k, and if so, execution continues from block 4310. Word testing continues until decision block 4385 finds that the word choice list is filled with matching words, or until decision block 4390 finds there are no additional words to test.

Returning to FIG. 4B, the word choice list is processed at block 4260. FIG. 4E shows a preferred embodiment for processing the word choice list. At block 4510, the words selected for the word choice list are sorted in ascending order by word length, so that words whose lengths are equal to the number of keys for the entry string will be presented as the most likely alternatives within the word choice list. At block 4520, each group of words of the same length is sorted in ascending order according the values of match_metric that have been calculated for each word, so that words with lower values of match_metric are presented as the most likely alternatives.

Words may be included in the vocabulary modules that are marked as known misspellings, for example, words in English in which the correct order of the letters "i" and "e" is commonly reversed. In one preferred embodiment, when such misspelled words are identified as candidate words from the vocabulary modules and are included in the word choice list, they are flagged such that they can be replaced in the word list at block 4540 with the corresponding correctly spelled words. Similarly, words may also be included in the vocabulary modules that are flagged as macros or abbreviations that are associated with other strings of text to be output and/or designated functions to be executed upon selection of the associated word. Such macros are also replaced in the word choice with the corresponding associated text strings at block 4540. Block 4560 applies the proper shift states to all characters of words within the word choice list, transforming the relevant characters into their proper form of upper case or lower case, according to the shift state that was in effect at the time the keystroke corresponding to each letter was performed. At block 4580 duplicate words in the word choice list are eliminated by removing the lowest priority duplicates.

In accordance with another aspect of the invention, a software application implementing the input method of the present invention is installed in an existing device. During the installation of this application in the device, existing information files are scanned for words to be added to the lexicon. Methods for scanning such information files are well known in the art. As new words are found during scanning, they are added to the lexicon structure as low frequency words, and as such are placed at the end of the word lists with which the words are associated. Depending on the number of times that a given new word is detected during the scanning, it is assigned a relatively higher and higher priority, by promoting it within its associated list, increasing the likelihood of the word appearing in the word selection list during information entry.

In accordance with another aspect of the invention, the lexicon of words has an appendix of offensive words, paired with similar words of an acceptable nature, such that entering the offensive word, even through Exact Typing of the locations of the letters comprising the offensive word, yields only the associated acceptable word in the Exact Type field, and if appropriate as a suggestion in the Word Selection List. This feature can filter out the appearance of offensive words which might appear unintentionally in the selection list once the user learns that it is possible to type more quickly when less attention is given to contacting the keyboard at the precise location of the intended letters. Thus, using techniques that are well known in the art, prior to displaying the Exact Type word string, the software routine responsible for displaying the word choice list simply compares the current Exact Type string with the appendix of offensive words, and if a match is found, replaces the display string with the associated acceptable word. Otherwise, even when an offensive word is treated as a very low frequency word, it would still appear as the Exact Type word when each of the letters of the word is directly contacted. Although this is analogous to accidentally typing an offensive word on a standard keyboard, the system of the present invention is designed to allow and even encourage the user to type with less accuracy. This feature can be enabled or disabled by the user, for example, through a system menu selection.

Those skilled in the art will also recognize that additional vocabulary modules can be enabled within the computer, for example vocabulary modules containing legal terms, medical terms, and foreign language terms. Via a system menu, the user can configure the system so that the additional vocabulary words can be caused to appear first or last in the list of possible words, with special coloration or highlighting. Consequently, within the scope of the appended claims, it will be appreciated that the invention can be practiced otherwise than as specifically described herein.

Returning through FIG. 4B to FIG. 4A, the word selection list is presented to the user and the main routine awaits the next keystroke from the touch screen 202 at block 4110. If, upon receipt of a keystroke, at block 4115 the system determines that the received keystroke contact point lies outside of the boundaries of the auto-correcting keyboard region 106, then the process of block 4120 is carried out as shown in FIG. 4I. Block 4910 identifies the character or function associated with the defined region. If at decision block 4920 the word choice list is empty, then block 4925 generates the character(s) associated with the defined key region, or executes the function associated with the defined key region, and at block 4970 the system returns to FIG. 4A. If one or more words are currently displayed in the word choice list, decision block 4930 determines if the keystroke x/y coordinate falls within the word-choice list region 150. If so, at block 4935 the system processes the word selection from the word-choice list.

In accordance with another aspect of the invention, the user presses a Space key to delimit an entered keystroke sequence. After receiving the Space key, the disambiguating system selects the most frequently used word and adds the word to the information being constructed. The Space key is used to delimit an entered sequence.

In accordance with another aspect of the invention, the word selection list is presented as a vertical list of candidate words, with one word presented in each row, and wherein each row is further subdivided into regions or columns. The regions or columns define functions related to the acceptance of the candidate string displayed in the selected row, such as including or not including a trailing blank space, appending a punctuation mark or applying a diacritic accent. The function may be applied when the user touches the row of the intended string in the word selection list at a point contained in the region or column associated with the desired function. When the user selects the desired candidate word by contacting the row within certain regions or columns, the word is automatically "accepted" for output and is added to the information being composed. For example, contacting a row within the region associated with appending a trailing space immediately outputs the associated word with a trailing space. In accordance with another aspect of the invention, one such region or column is defined such that contacting a row within the region invokes a function which replaces the current input sequence of actual contact points with a sequence of contact points corresponding to the coordinate locations of the letters comprising the word in the selected row, but without terminating the current input sequence. As a result, the selected word appears in the selection list as the Exact Type interpretation of the input sequence. In most cases, the selected word also appears as the most likely word interpretation of the input sequence, although if the letters of the word are each near those of a much more frequent word, the more frequent word will still appear as the most likely word interpretation. This ability to re-define the input sequence as the coordinate locations of the letters of the intended word without terminating the input sequence enables the user to then continue typing, for example, a desired inflection or suffix to append to the word. When the intended word is relatively infrequent, and especially when it is seen only infrequently with the desired inflection or suffix, this feature makes it easier for the user to type the desired infrequently occurring form of the infrequent word without needing to carefully type each letter of the word. Only one additional selection step is required when the uninflected form of the word is selected by contacting the associated row in the selection list in the region associated with this feature.

Figure 4J:
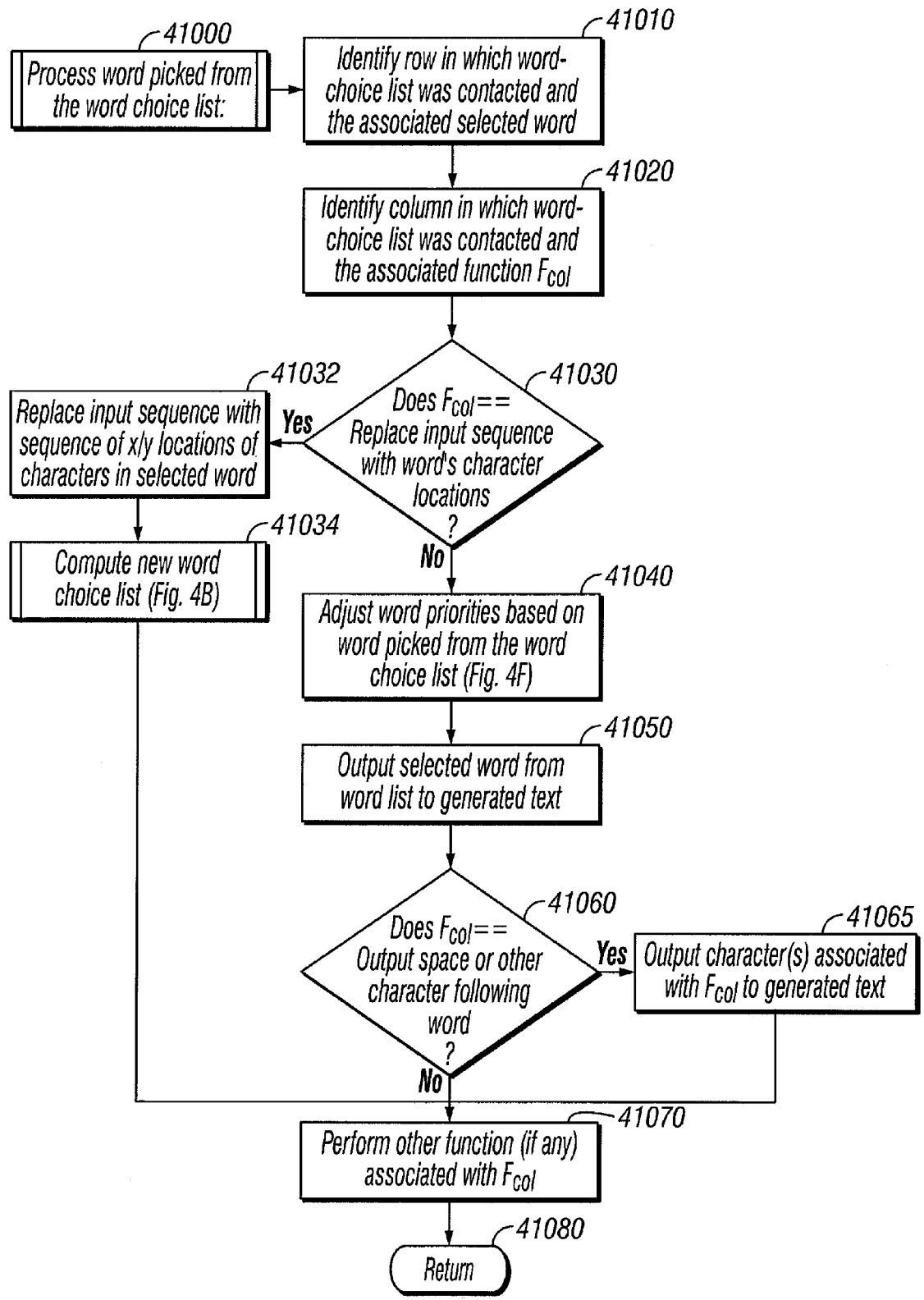
Figure 4K:
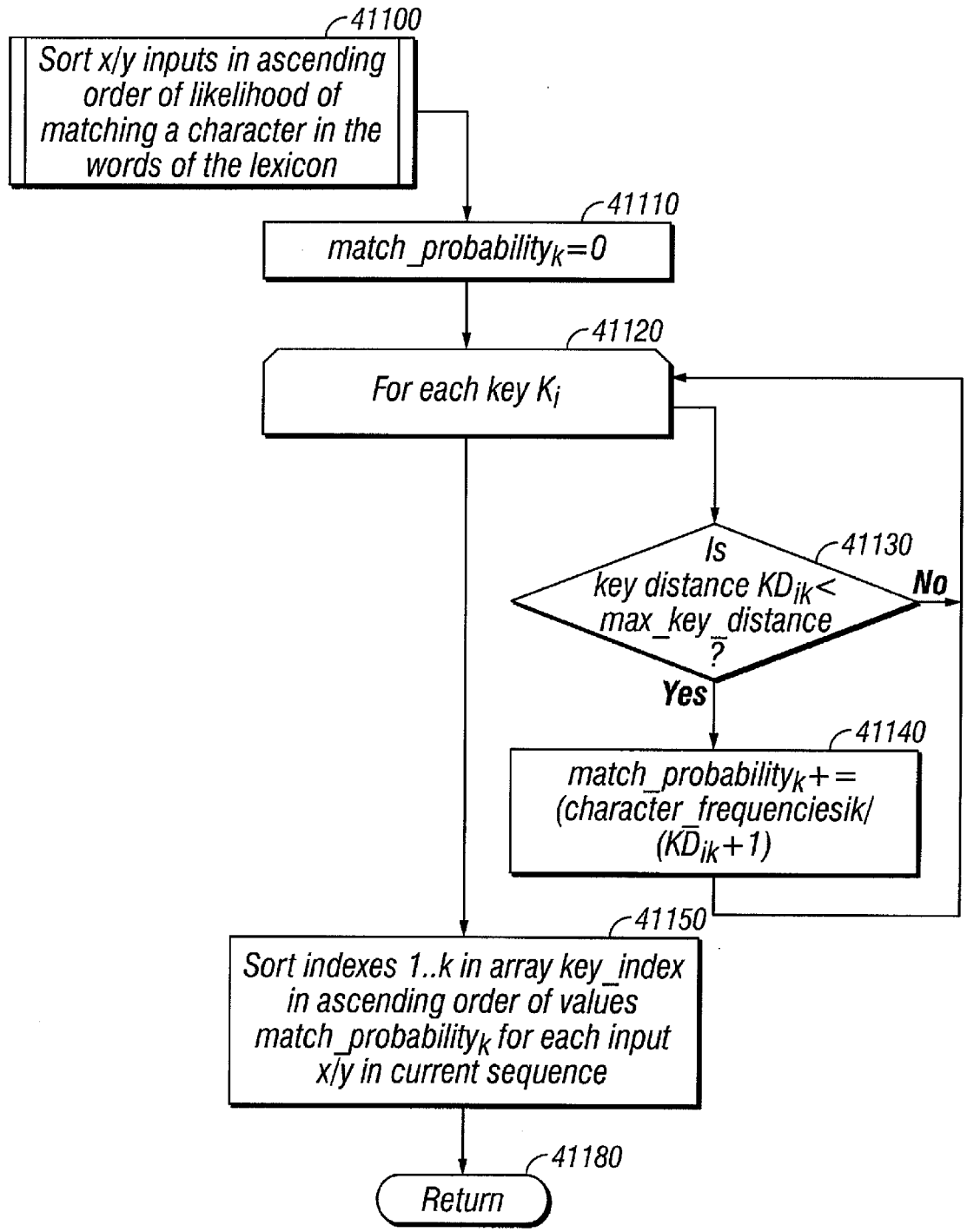

FIG. 4J shows a preferred embodiment for processing word-choice list selections, registering contacts within regions 154, 157, or 160. Block 41010 identifies which row of the word-choice list was contacted and the associated word. Block 41020 identifies the word-choice list column that was contacted and the associated function $F_{col}$ for that column. In the preferred embodiment shown in FIG. 1B, three different columns are defined: one to the left of column marker 170, one to the right of column marker 172, and one between the column markers 170 and 172. Decision block 41030 determines if the function $F_{col}$ consists of replacing the input sequence with a new set of x/y locations of the word selected, which in the preferred embodiment shown in FIG. 1B, corresponds to an x/y location to the right of column marker 172. If so, block 41032 replaces the input sequence with the sequence of x/y locations corresponding to the characters of the selected word and at block 41034 a new word choice list is generated as shown in FIG. 4B. If function $F_{col}$ does not replace the input sequence, processing of the selected word from the word choice list continues. Block 41040 adjusts the selected word's priorities.

In accordance with another aspect of the invention, during use of the system by a user, the lexicon is automatically modified by a "Promotion Algorithm" which, each time a word is selected by the user, acts to "promote" that word within the lexicon by incrementally increasing the relative frequency associated with that word. In one preferred embodiment, the Promotion Algorithm increases the value of the frequency associated with the word selected by a relatively large increment, while decreasing the frequency value of those words passed over by a very small decrement. For a lexicon in which relative frequency information is indicated by the sequential order in which words appear in a list, promotions are made by moving the selected word upward by some fraction of its distance from the head of the list. The Promotion Algorithm is designed to tend to avoid moving the words most commonly used and the words very infrequently used very far from their original locations. In one preferred embodiment, this is achieved by altering the fraction of the remaining distance by which a selected word is promoted depending on its current relative position in the overall list. For example, words in the middle range of the list are promoted by the largest fraction with each selection. Words intermediate between where the selected word started and finished in the lexicon promotion are effectively demoted by a value of one. Conservation of the "word list mass" is maintained, so that the information regarding the relative frequency of the words in the list is maintained and updated without increasing the storage required for the list.

In accordance with another aspect of the invention, the Promotion Algorithm operates both to increase the frequency of selected words, and where appropriate, to decrease the frequency of words that are not selected. For example, in a lexicon in which relative frequency information is indicated by the sequential order in which words appear in a list, a selected word which appears at position IDX in the list is moved to position (IDX/2). Correspondingly, words in the list at positions (IDX/2) down through (IDX+1) are moved down one position in the list. Words are demoted in the list when a sequence of contact points is processed and a word selection list is generated based on the calculated matching metric values, and one or more words appear in the list prior to the word selected by the user. Words that appear higher in the selection list but are not selected may be presumed to be assigned an inappropriately high frequency (i.e., they appear too high in the list). Such a word that initially appears at position IDX is demoted by, for example, moving it to position (IDX*2+1). Thus, the more frequent a word is considered to be, the less it is demoted in the sense that it is moved by a smaller number of steps.

In accordance with another aspect of the invention, the promotion and demotion processes may be triggered only in response to an action by the user, or may be performed differently depending on the user's input. For example, words that appear higher in a selection list than the word intended by the user are demoted only when the user selects the intended word by "clicking and dragging" the intended word to the foremost location within the word selection list, using a stylus or mouse. Alternatively, the selected word that is manually "dragged" to a higher position in the selection list may be promoted by a larger than normal factor. For example, the promoted word is moved from position IDX to position (IDX/3). Many such variations will be evident to one of ordinary skill in the art.

FIG. 4F shows a preferred embodiment for adjusting the prioritization of words when a word is picked from the word choice list. Decision block 4610 determines if the selected word choice item is the exact-type word, that string of characters whose x/y locations happens to correspond exactly to the sequence of contact points, which in a preferred embodiment is displayed in a distinct location in the word choice list, such as in FIG. 1B where the exact-type word 154 ("rwzt" in the example shown) is separated by a solid line from other words in the list. If the chosen word is not the exact-type word, such as items 157 or 160, at block 4620 the chosen word is promoted (as in the preferred embodiment shown in FIG. 4G), and at block 4630 each of the words that appeared in the word choice list ahead of the chosen word are explicitly demoted (as in the preferred embodiment shown in FIG. 4H, in contrast to the incidental demotion that may occurs to one or more words simply as a consequence of the promotion of another word).

If at block 4610, the chosen word is determined to be the exact-type word, decision block 4640 identifies if that word is a new word that is not yet included in the vocabulary modules. If not, then at block 4650 promotes the chosen word is promoted. If the chosen exact-type word is not yet included in the vocabulary modules, block 4660 identifies the appropriate word-list to which the word is to be added. Decision block 4665 identifies if space is available within the appropriate word-list, And if not, at block 4670 the last, least likely word in the appropriate word-list is deleted to make room for the word to be added. At block 4675 the new word is added as the least likely word in the appropriate word-list, then at block 4680 the newly added word is promoted without explicitly demoting the other words that appeared in the word choice list.

FIG. 4G shows a preferred embodiment of the word promotion performed in blocks 4620, 4650 and 4680. Block 4710 identifies the chosen word's position within its word-list, and assigns idx that position value. Block 4720 defines new_idx as one half of the value of idx, specifying a position in the list halfway from the current position to the head of the list (the position of the word deemed to be most likely to be selected). Block 4730 demotes all words in positions between idx and new_idx by one position, filling the word's old position at idx and making room for the word at new_idx. Block 4740 then promotes the chosen word by inserting it back into the list at position new_idx. Note that this preferred method of promotion essentially has the effect of decrementing by 1 the idx_multiplier calculated for the word at block 4355.

FIG. 4H shows a preferred embodiment of explicit word demotion performed in block 4635. Block 4810 identifies the explicitly demoted word's position within its word-list, and assigns idx that position value. Block 4820 defines new_idx as double the value of idx plus one. Decision block 4830 compares the value of new_idx to the total number of words in the word-list. If new_idx is greater than the total number of words in the word-list, Block 4835 sets new_idx equal to the value of the number of words in the word-list, since a word can be demoted no further than the end of the list. Block 4840 promotes all words in positions between idx and new_idx by one position, filling the word's old position at idx and making room for the word at new_idx. Block 4850 then demotes the chosen word by inserting it back into the list at position new_idx. Note that this preferred method of demotion essentially has the effect of incrementing by 1 the idx_multiplier calculated for the word at block 4355.

FIGS. 5A through 5E are schematic views showing a sequence of character inputs as an illustrative example of entering a word on the preferred embodiment of a portable computer 102 incorporating a reduced auto-correcting keyboard system 100 formed in accordance with the present invention as shown in FIGS. 1A and 1B. Portable computer 102 contains a reduced keyboard 105 implemented on a touch screen display 103, which is used to generate text to be output to text display region 104.

Figure 5A:
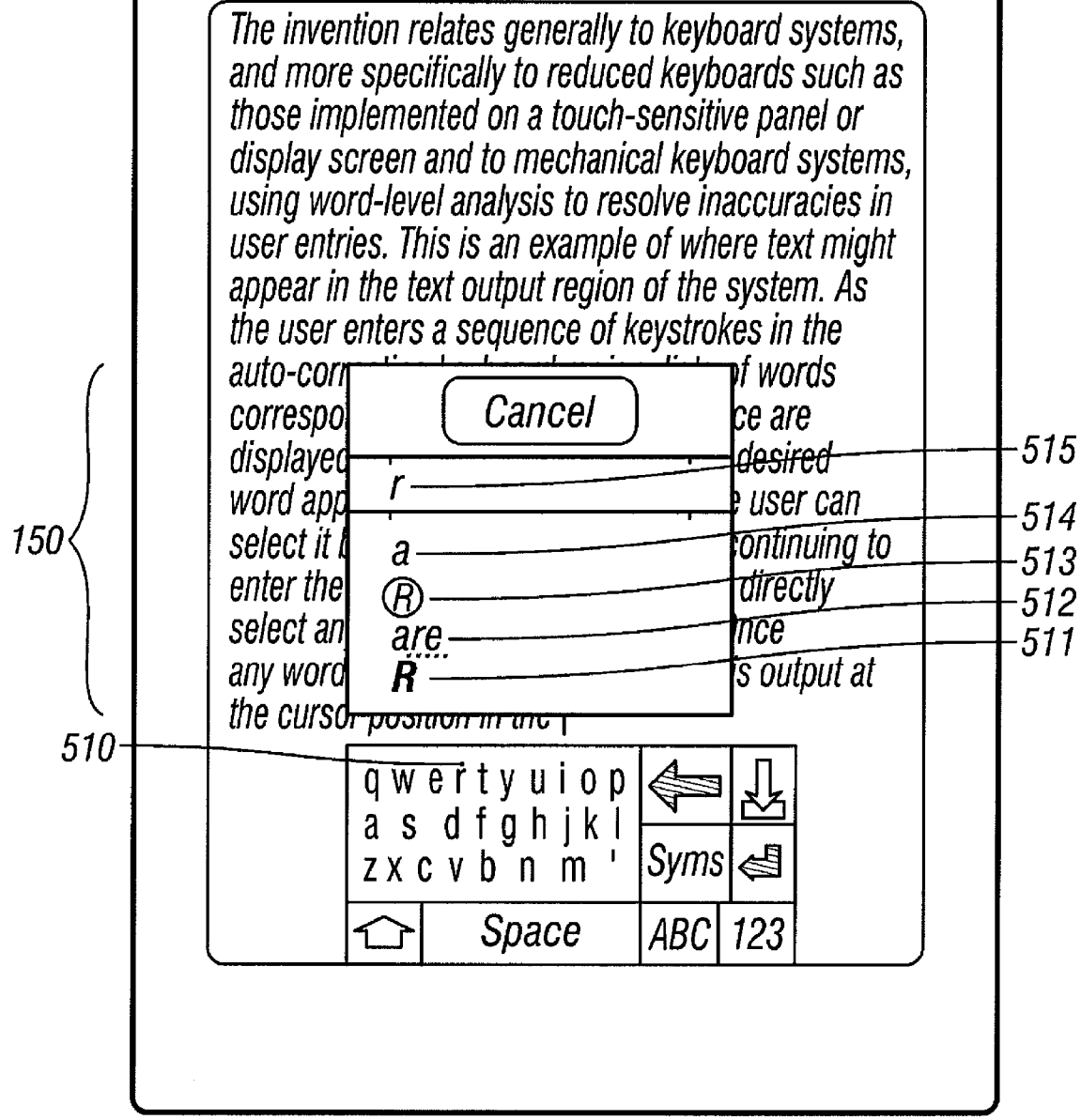
FIGS. 5A through 5E are schematic views showing a sequence of character inputs as an illustrative example of entering a word on a preferred embodiment of a portable computer incorporating a reduced keyboard system of the present invention.

FIG. 5A shows the location 510 of the first keystroke of a sequence of keystrokes corresponding to the entry of the word "text." In response to the keystroke 501, the auto-correcting keyboard system displays the word choice list region 150 super-imposed on top of the text region 104, showing a list of words and other interpretations corresponding to the keystroke. In this example, the coordinate location 510 of the keystroke is physically nearest coordinate location associated with the letter "r." The word choice list includes "R" 511 as the default choice, shown in the word choice list in the position nearest the auto-correcting keyboard region 106. Since the letter "r", when it occurs as a "word" that is only one letter in length, is found more frequently in upper case (such as when "R" appears as an initial included as part of a person's name), "R" is offered in the word choice list in upper case. This is in accordance with the aspect of the present invention wherein information regarding the capitalization of each word is stored along with the word in the vocabulary modules so that the word can be presented in a preferred form of capitalization without requiring the user to activate keys (such as a Shift key) to specify the capitalization of the word entered. The word choice list shows "are" 512 as the next most likely choice, in accordance with the aspect of the present invention wherein a word or symbol may be associated with an arbitrary sequence of one or more letters, such that when the associated sequence of letters is entered by the user, the word or symbol is offered as a choice in the word choice list. In this example, the word "are" is associated as a "macro" expansion of the single letter "r" which is pronounced the same in English. Similarly, the word choice list shows "®"513 as the third most likely choice, where this symbol has been included in the vocabulary modules based on the logical association with the letter "r." The word choice list shows "a" 514 as the fourth most likely choice, where "a" is a very commonly occurring word of one letter, so that it appears as a candidate in the word choice list even though the coordinate location associated with the letter "a" is relatively distant from contact location 501. Above these choices is the exact type region displaying "r" 515 as an option for selection, since the coordinate location associated with the letter "r" is closer than that of any other letter to coordinate location 510 of the keystroke.

Figure 5B:
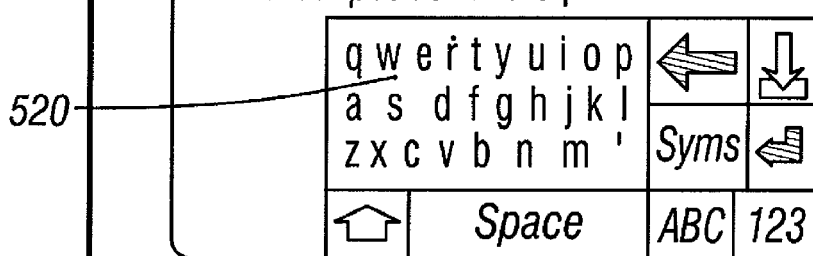

FIG. 5B shows the location 520 of the next keystroke, nearest to the coordinate location associated with the letter "w." The word choice list includes "re" 521 as the default choice, "Re" 522 as the next most likely choice, "ra" 523 as the third most likely choice and "Rs" 524 as the fourth most likely choice. Above these choices is the exact type region displaying "rw" 525 as an option for selection.

Figure 5C:
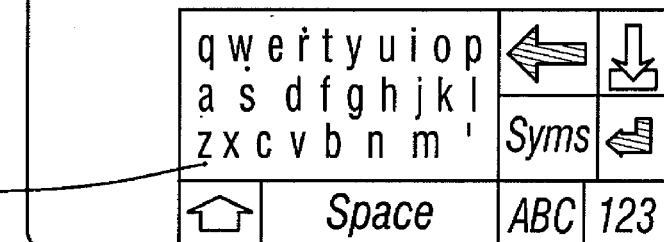

FIG. 5C shows the location 530 of the next keystroke, nearest to the coordinate location associated with the letter "z." The word choice list includes "tax" 531 as the default choice, "Rex" 532 as the next most likely choice, "fax" 533 as the third most likely choice and "was" 534 as the fourth most likely choice. Above these choices is the exact type region displaying "rwz" 535 as an option for selection.

Figure 5D:
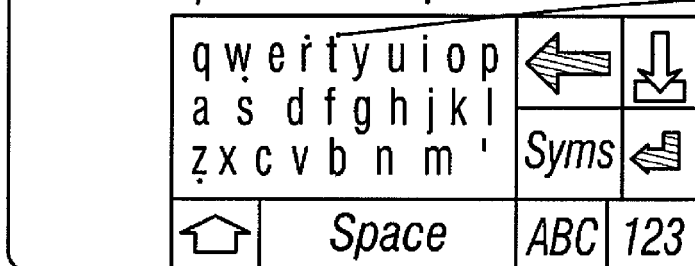

FIG. 5D shows the location 540 of the next keystroke, very near the coordinate location associated with the letter "t." The word choice list includes "text" 541 as the default choice, "year" 542 as the next most likely choice, "rest" 543 as the third most likely choice and "fact" 544 as the fourth most likely choice. Above these choices is the exact type region displaying "rwzt" 545 as an option for selection. The word "text" is to be entered as the next word.

Figure 5E:
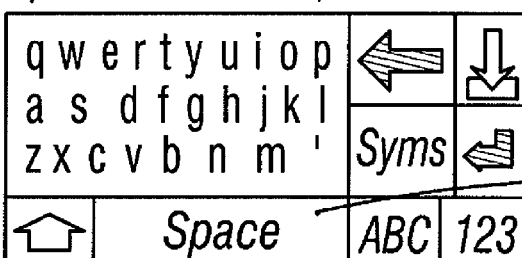

FIG. 5E shows the next keystroke at 550, in the region designated as the "space" key. The space key is outside of the auto-correcting keyboard region 106, and thus can be unambiguously associated with a specific function. The space key acts to accept the default word "text" 541 and enters the word "text" 542 in the text output region 104 at the insertion point 107 in the text being generated where the cursor was last positioned. Simultaneously, the current input sequence is cleared, and the word choice list display is removed from the display screen 103 of the portable computer 102 so that the text output region 104 is unobscured.

While the preferred embodiment of the invention has been illustrated and described, it will be appreciated that various changes can be made therein without departing from the spirit and scope of the invention. For example, those skilled in the art will appreciate that the keyboard 105 and its auto-correcting keyboard region 106 may be configured in various ways, and may have a varying number of explicit function keys 108-122. The auto-correction technique disclosed herein is equally applicable to keyboards of different sizes, and to traditional mechanical keyboards of various sizes as well as touch-panel and touch-screen based keyboards such as the one described in the preferred embodiment. The specific format of the word choice list 150, such as the number of word choices presented, the arrangement of the word choices, and the functions associated with different areas of the word choice list may be changed. For example, those skilled in the art will appreciate that the function that consists of replacing the input sequence with a new set of x/y locations of the word selected could be omitted in certain applications. Furthermore, the specific algorithms used in promoting and demoting words within the vocabulary modules could also be altered. For example, a selected word could be promoted by moving it ¼ of the distance to the head of its list rather than the factor of ½ used in the preferred embodiment described above.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A text entry system comprising:
    (a) a user input device comprising an auto-correcting keyboard region comprising a plurality of the members of a character set, wherein locations having known coordinates in the auto-correcting keyboard region are associated with corresponding character set members, wherein user interaction with the user input device within the auto-correcting keyboard region determines a location associated with the user interaction and wherein the determined interaction location is added to a current input sequence of contact locations;
    (b) a memory containing a plurality of objects;
    (c) an output device with a text display area; and
    (d) a processor coupled to the user input device, memory, and output device, said processor comprising:
        (i) a distance value calculation component which, for each determined interaction location in the input sequence of interactions, calculates a set of distance values between the interaction locations and the known coordinate locations corresponding to one or a plurality of character set members within the auto-correcting keyboard region;
        (ii) an object evaluation component which, for each generated input sequence, identifies any candidate objects in memory, and for each of the identified candidate objects, evaluates each identified candidate object by calculating a matching metric based on the calculated distance values associated with the object, and ranks the evaluated candidate objects based on the calculated matching metric values if more than one object is identified; and
        (iii) a selection component for identifying one or more candidate objects according to an evaluated ranking, presenting at least one identified object to the user, and enabling the user to select from amongst said at least one presented object for output to the text display area on the output device.

2. The system of claim 1, further comprising:
    a promotion component for changing a relative promotion value associated with each object in memory as a function of the user interaction with said plurality of objects.

3. The system of claim 1, wherein, at least one location in the auto-correcting keyboard region comprises a discrete key associated with a corresponding character set member.

4. The system of claim 1, wherein when a key activation event is detected comprising substantially simultaneous activation of a plurality of adjacent discrete keys in the auto-correcting region, a location corresponding to said key activation event is determined as a function of the locations of the simultaneously activated keys, and said determined location is appended to a current input sequence of the locations of the key activation events.

5. A text entry system, comprising:
    (a) a user input device comprising an auto-correcting keyboard region comprising a plurality of the members of a character set, wherein locations having known coordinates in the auto-correcting keyboard region are associated with corresponding character set members, wherein user interaction with the user input device within the auto-correcting keyboard region determines a location associated with the user interaction and wherein said determined interaction location is added to a current input sequence of interaction locations;
    (b) a memory containing a plurality of objects, wherein each of the plurality of objects in memory is associated with one or a plurality of predefined groupings of objects;
    (c) an output device with a text display area; and
    (d) a processor coupled to the user input device, memory, and output device, said processor comprising:
        (i) a distance value calculation component which, for each determined interaction location in the input sequence user interactions, calculates a set of distance values between an interaction location and said known coordinate locations within the auto-correcting keyboard region;
        (ii) an object evaluation component which, for each generated input sequence, identifies at least one candidate object in memory, and for any identified candidate object, evaluates said identified candidate object by calculating a matching metric based on the calculated distance values associated with the object, and ranks evaluated candidate objects based on the calculated matching metric values; and (iii) a selection component for identifying one or more candidate objects according to their evaluated ranking, presenting the one or more identified objects to the user, and enabling the user to select one of said one or more presented objects for output to the text display area on the output device.

6. A text entry system, comprising:
(a) a user input device comprising an auto-correcting keyboard region comprising a plurality of the characters of a character set, wherein locations having known coordinates in the auto-correcting keyboard region are associated with corresponding character set members, wherein user interaction with the user input device within the auto-correcting keyboard region determines a location associated with the user interaction and wherein the determined interaction location is added to a current input sequence of contact locations;
(b) a memory containing a plurality of objects, wherein each object comprises a string of one or more character set members;
(c) an output device with a text display area; and
(d) a processor coupled to the user input device, memory, and output device, said processor comprising:
   (i) a distance value calculation component which, for each determined interaction location in the input sequence of interactions, calculates a set of distance values between the interaction locations and the known coordinate locations corresponding to one or more character set members within the auto-correcting keyboard region;
   (ii) an object evaluation component which, for a generated input sequence, evaluates at least one candidate object in memory by calculating a matching metric based on the calculated distance values for the object; and ranks the evaluated candidate objects based on the calculated matching metric values; and
   (iii) a selection component which presents said at least one candidate object to the user according to its ranking, and enables the user to select among presented objects for output to the text display area on the output device.

7. The system of claim 6, wherein each character set member associated with the auto-correcting keyboard region is assigned a Cartesian coordinate and wherein the distance value calculation component calculates the distance between the interaction location and the location corresponding to a character according to standard Cartesian coordinate distance analysis.

8. The system of claim 6, wherein the selection component presents the identified one or a plurality of candidate objects for selection by the user in a candidate object list in the text display area.

9. The system of claim 6, wherein a user selection of a character set member or function that is associated with an interaction outside of the auto-correcting keyboard region accepts and outputs the determined highest ranked candidate object at a text insertion point in the text display area prior to outputting the selected character set member at the text insertion point in the text display area or prior to executing the function.

10. The system of claim 6, wherein user selection of an object for output at a text insertion point in the text display area terminates the current input sequence, wherein a next interaction within the auto-correcting keyboard region starts a new input sequence.

11. The system of claim 6, wherein the object evaluation component determines, for each determined interaction location in each input sequence of interaction locations, the closest known location corresponding to a character set member, and constructs an exact typing object composed of said determined corresponding character set members in the order corresponding to the input sequence of interaction locations.

12. The system of claim 11, wherein the selection component presents said exact typing object at the text insertion point in the text display area on the output device.

13. The system of claim 6, wherein the selection component identifies the highest ranked candidate object and presents the identified object at the text insertion point in the text display area on the output device.

14. The system of claim 6, wherein the processor further comprises a stroke recognition component that determines for each user interaction within the auto-correcting keyboard region whether the point of interaction is moved less than a threshold distance from the initial interaction location;
wherein the point of interaction is moved less than a threshold distance from the initial interaction location, the stroke recognition component determines that the user interaction is a tap interaction, and the location determined to be associated with the user interaction is added to the current input sequence of interaction locations to be processed by the distance value calculation component, the object evaluation component, and the selection component;
wherein the point of interaction is moved greater than or equal to a threshold distance from the initial interaction location, the stroke recognition component determines that the user interaction is one of a plurality of stroke interactions that are associated with known system functions or recognizable character set members, and classifies the stroke interaction as one of the plurality of predefined types of stroke interactions or recognizable character set members.

15. The system of claim 6, wherein when a threshold number of interaction locations in the input sequence are further than a threshold maximum distance from the corresponding character set member in the sequence of character set members comprising a given candidate object, said object is identified as no longer being a candidate object for the selection component.

16. The system of claim 6, wherein when a threshold number of candidate objects have been identified, a lowest-ranked evaluated candidate object is identified and said object evaluation component eliminates the lowest-ranked identified object from further consideration.

17. The system of claim 6, wherein the set of distance values between a predetermined interaction location and the locations of corresponding character set members which are nearer than a threshold minimum distance from said predetermined interaction location is computed in advance.

18. The system of claim 6, wherein the object evaluation component calculates a matching metric for a candidate object using calculated distance values between a known coordinate location corresponding to that character set member and adjacent locations of corresponding character set members, for each character set member contained in said candidate object whose calculated distance value is non-zero.

19. A text entry system, comprising:
(a) a user input device comprising an auto-correcting keyboard region comprising a plurality of the characters of a character set, wherein locations having known coordinates in the auto-correcting keyboard region are associated with corresponding character set members, wherein user interaction with the user input device within the auto-correcting keyboard region determines a location associated with the user interaction and wherein the determined interaction location is added to a current input sequence of contact locations;

(b) a memory containing a plurality of objects, wherein each object comprises a string of one or more character set members;

(c) an output device with a text display area; and (d) a processor coupled to the user input device, memory, and output device, said processor comprising:

(i) an object evaluation component which, for a generated input sequence, evaluates at least one candidate object in memory by calculating a matching metric based on distance values calculated between the determined interaction locations and known coordinate locations corresponding to one or more character set members within the auto-correcting keyboard region; and ranks the evaluated candidate objects based on the calculated matching metric values; and (ii) a selection component which presents said at least one candidate object to the user according to its ranking, and enables the user to select among presented objects for output to the text display area on the output device.

20. The system of claim 19, wherein the object evaluation component calculates the matching metric for a candidate object using the distance values between the known coordinate location corresponding to that character set member and the adjacent locations of corresponding character set members, for each character set member contained in said candidate object whose calculated distance value is non-zero.

21. The system of claim 19, wherein one or more objects in memory are associated with a secondary object in memory comprising a designated function and wherein, when the user selects one of the presented objects associated with a secondary object, the designated function is executed.

22. A text entry system, comprising:

(a) a reduced user input device comprising an auto-correcting keyboard region comprising a plurality of character set members, wherein locations having known coordinates in the auto-correcting keyboard region are associated with corresponding character set members, each location having associated therewith a plurality of said character set members of said alphabet such that contact with one of said locations is ambiguous as to which character set member associated with the location is intended, wherein each time a user contacts the user input device within the auto-correcting keyboard region, a location associated with the user contact is determined and the determined contact location is added to a current input sequence of contact locations;

(b) a memory containing a plurality of objects, wherein each object is a string of one or a plurality of character set members;

(c) an output device with a text display area; and (d) a processor coupled to the user input device, memory, and output device, said processor comprising:

(i) a distance value calculation component which, for each determined contact location in the input sequence of contacts, calculates a set of distance values between the contact locations and the known coordinate locations corresponding to one or a plurality of character set members within the auto-correcting keyboard region;

(ii) an object evaluation component which, for each generated input sequence, identifies at least one candidate object in memory, and for each of the at least one identified candidate objects, evaluates each identified candidate object by calculating a matching metric based on the calculated distance values associated with the object, and ranks evaluated candidate objects based on the calculated matching metric values; and (iii) a selection component for identifying at least one candidate object according to an evaluated ranking, presenting the at least one identified object to the user, and enabling the user to select one of the at least one presented objects for output to the text display area on the output device.

23. The system of claim 22, wherein objects in memory are further associated with at least one module, wherein said module comprises a set of objects having at least one common characteristic or that is generated by a common process/algorithm or alternate method of interpreting said current input sequence.

24. The system of claim 23, wherein said module modifies or generates objects based on linguistic patterns, which may comprise placing a diacritic mark on a particular syllable, or based on surrounding context.

25. The system of claim 23, wherein said module adjusts the matching metric for suffixes and/or inflexions to reflect any of context, user preference, writing style, and grammatical voice.

26. The system of claim 23, wherein for multiple concurrent languages, said system automatically switches the order of the objects based on which module supplied one or more preceding selected objects.

27. The system of claim 23, wherein said module employs templates of valid symbol or sub-object sequences to determine which symbols around an interaction point are possible given preceding interactions and the objects being considered.

28. The system of claim 23, wherein the text entry system comprises a module selector wherein a user can determine which modules are to be evaluated by the object evaluation component to identify candidate objects.

29. The system of claim 23, wherein the plurality of modules comprises word stem modules and prefix and/or suffix modules, wherein each word stem module comprises a logical organization of uninflected word stem objects, and wherein each prefix and/or suffix module comprises a logical organization of prefixes and/or suffixes which can be appended to word stems to form inflected words, wherein each word stem module is associated with one or a plurality of prefix and/or suffix modules, wherein whenever the object evaluation component calculates a matching metric value for a given word stem in a given word stem module with respect to an initial sequence of contacts within an input sequence, such that the calculated matching metric value ranks higher than a predetermined threshold, the word evaluation component evaluates the remaining contacts of the input sequence with respect to the associated prefix and/or suffix modules; and wherein whenever the object evaluation component calculates a matching metric value for a given prefix and/or suffix in one of said associated prefix and/or suffix modules that ranks higher than a second predetermined threshold, said prefix and/or suffix is appended to said word stem to form a completed object corresponding to a matching metric value that is a function of said determined word stem matching metric value and said determined prefix and/or suffix matching metric value.

30. The system of claim 29, wherein one or more of said prefix and/or suffix is further associated with a secondary object in memory comprising a sequence of one or a plurality of character set members;
   wherein said associated secondary object is appended to said word stem to form a completed object corresponding to a matching metric value that is a function of said determined word stem matching metric value and said determined prefix and/or suffix matching metric value; and
   wherein, the selection component presents the completed object for selection.

31. The system of claim 22, wherein objects are determined by a context which comprises any of:
   immediately preceding or following words,
   formality of a writing style chosen by the user in current text or habitually; and
   the type of input field or application.

32. The system of claim 31, wherein objects are either determined by vocabulary modules relevant to said context or the calculated matching metric value of any of likely words, word stems, prefixes, or suffixes is adjusted appropriately, given said context.

33. The system of claim 31, wherein specific vocabularies are supplied to the system by said input field or application for use in a current context.

34. The system of claim 22, wherein each member of the character set associated with the auto-correcting keyboard region is assigned a Cartesian coordinate and wherein the distance value calculation component calculates the distance between the contact location and the location corresponding to a symbol according to standard Cartesian coordinate distance analysis.

35. The system of claim 34, wherein for each interaction location the distance between said location and a known location of a character set member in a subsequently selected object are divided into horizontal and vertical offsets and a running average of each offset is maintained, wherein said offsets are optionally applied to subsequent interaction locations to adjust for systematic errors in accuracy.

36. The system of claim 22, wherein each location on the auto-correcting keyboard region is defined by a horizontal and a vertical coordinate, and wherein the distance value between a contact location and the known coordinate location corresponding to a character set member comprises a horizontal and a vertical component, wherein the vertical component is adjusted by a weighting factor in calculating the distance of the contact location from the character set member.

37. The system of claim 22, wherein at least one of the locations with known coordinates in the auto-correcting keyboard region corresponds to a plurality of character set members, one or a plurality of which include various diacritic marks, wherein the plurality of character set members comprise variant forms of a single base character set member, and wherein objects in memory are stored with their correct accented character set members.

38. The system of claim 22, wherein information regarding the capitalization of one or a plurality of objects is stored along with the objects in memory, and wherein the selection component presents each identified object in a preferred form of capitalization according to the stored capitalization information.

39. The system of claim 22, wherein one or a plurality of objects in memory are associated with a secondary object in memory comprising a sequence of one or a plurality of character set members and wherein, when the selection component identifies one of said objects for presentation to the user based on the matching metric calculated by the object evaluation component, the selection component presents the associated secondary object for selection.

40. The system of claim 22, further comprising at least one application program comprising any of:
   a word processor;
   a dictionary;
   a foreign language translator; and
   speech synthesis software.

41. The system of claim 22, further comprising:
   a component for identifying misspelled words.

42. The system of claim 22, wherein said plurality of objects comprises correctly spelled words and said object evaluation component identifies and ranks one or more said correctly spelled words corresponding to said input sequence of interactions.

43. The system of claim 22, wherein the object evaluation component calculates the matching metric for each candidate object by summing the number of contact locations in the input sequence exceeding a threshold distance to the location assigned to the character in the corresponding position of the candidate object.

44. The system of claim 22, wherein said matching metric comprises a weighted difference between the number of characters in the candidate object and the number of inputs in the current input sequence.

45. The system of claim 22, wherein said character set comprises any of a language alphabet; a set of symbols representing sub-word components; and phonetic spelling of an ideographic language.

46. The system of claim 22, wherein user contact with said user input device comprises a stroke event, said system further comprising a stroke recognition system.

47. The system of claim 46, wherein each stroke event recognized by a stroke recognition system has an associated value used in calculating said matching metric, based on resemblance to character set member shape templates rather than distance to known character set member locations.

48. The system of claim 47, further comprising:
   means for converting said calculated matching metric values to their distance equivalents and/or incorporating recognized character set members into an input sequence, and including one or more possible character set member interpretations of each stroke event.

49. The system of claim 22, wherein one or more character set members corresponds to a location within or outside of the auto-correcting keyboard region, wherein a determined interaction location for said one or more character set members is added to a current input sequence of contact locations as an explicit character set member entry that supersedes distance calculations and only matches said character set member at that position in each candidate object.

50. The system of claim 49, further comprising a delete key region associated with a delete function, wherein when the current input sequence includes at least one interaction and said delete key region is contacted, the character set member associated with the next determined interaction location is added to said current input sequence as said explicit character set member entry.

51. The system of claim 22, said auto-correcting keyboard region comprising a telephone keypad format, wherein multiple said character set members are associated with defined keys, wherein the character set members in each cluster are mapped to a same sub-region and for which the calculated distance is zero for any user interaction within the sub-region.

52. The system of claim 22, further comprising:
means for dynamically changing character set member locations or sub-regions within the auto-correcting keyboard region.

53. The system of claim 52, wherein said means for dynamically changing either assigns more sub-region area to character set members that are more frequent, thus decreasing their ambiguity, based on the user's own vocabulary or pattern of use, or visually reflects the cumulative inaccuracy adjustments by moving character set members and reshaping their sub-regions.

54. The system of claim 52, wherein said means for dynamically changing assigns more sub-region area to a character set member based on the frequency of said character set member at a given position in said strings of said plurality of objects in memory.

55. The system of claim 22, wherein said memory further contains a plurality of objects comprising a string of one or a plurality of character set members representing unacceptable/offensive words which is used to filter the said at least one identified object presented to the user.

56. The system of claim 22, further comprising an input means associated with a Cancel function, wherein when the current input sequence includes at least one interaction and said input means is used, said selection component removes one or more of said at least one identified candidate object from presentation to the user.

57. The system of claim 22, wherein said user contact comprises one or more interactions at one or more locations within the auto-correcting keyboard region.

58. The system of claim 22, wherein said auto-correcting keyboard region is displayed or printed on the surface of the user input device without defined key boundaries.

* * * * *